(12) United States Patent
Hori et al.

(10) Patent No.: US 7,158,641 B2
(45) Date of Patent: Jan. 2, 2007

(54) RECORDER

(75) Inventors: Yoshihiro Hori, Gifu (JP); Toshiaki Hioki, Ogaki (JP); Miwa Kanamori, Ogaki (JP); Seigou Kotani, Kawasaki (JP); Takayuki Hasebe, Kawasaki (JP); Takahisa Hatakeyama, Kawasaki (JP); Tadaaki Tonegawa, Kodaira (JP); Takeaki Anazawa, Tokyo (JP)

(73) Assignees: Sanyo Electric Co., Ltd., Osaka (JP); Fujitsu Limited, Kawasaki (JP)

( * ) Notice: Subject to any disclaimer, the term of this patent is extended or adjusted under 35 U.S.C. 154(b) by 830 days.

(21) Appl. No.: 10/130,294

(22) PCT Filed: Nov. 29, 2000

(86) PCT No.: PCT/JP00/08457

§ 371 (c)(1),
(2), (4) Date: May 30, 2002

(87) PCT Pub. No.: WO01/41104

PCT Pub. Date: Jun. 7, 2001

(65) Prior Publication Data

US 2002/0184513 A1 Dec. 5, 2002

(30) Foreign Application Priority Data

Nov. 30, 1999 (JP) ................... 11-340365

(51) Int. Cl.
*H04L 9/00* (2006.01)
*H04L 9/32* (2006.01)

(52) U.S. Cl. .................. 380/277; 380/272; 380/44; 380/46; 713/189

(58) Field of Classification Search ............... 380/277, 380/281–282, 284–285, 44, 46; 713/189, 713/168, 171; 705/59
See application file for complete search history.

(56) References Cited

U.S. PATENT DOCUMENTS 5,765,152 A 6/1998 Erickson (Continued)

FOREIGN PATENT DOCUMENTS

| JP | 08-125651 | 5/1996 |
| JP | 9-312643 | 12/1997 |
| JP | 10-40172 | 2/1998 |

(Continued)

OTHER PUBLICATIONS

Abhijit K. Choudhury, et al., "Copyright Protection for Electronic Publishing Over Computer Networks", IEEE Network, May/Jun. 1995, pp. 12-20.

(Continued)

*Primary Examiner*—H. Song
(74) *Attorney, Agent, or Firm*—Westerman, Hattori, Daniels & Adrian, LLP

(57) ABSTRACT

A memory card (110) decodes data delivered to a data bus (BS3) and extracts a session key (Ks1) sent from a server from the data. Based on the session key (Ks1), an encrypting section (1406) encrypts a public encryption key (KPm (1)) of the memory card (110) and delivers it to a server through the data bus (BS3). The memory card (110) receives data including a license key (Kc) and a license (ID) encrypted with the public encryption key (KPm (1)) different with memory card to memory card, decrypts the data, encrypted it again with uniquely given secret key (K(1)), and stores it in a memory (1415).

14 Claims, 27 Drawing Sheets

U.S. PATENT DOCUMENTS

| | | | |
|---|---|---|---|
| 5,903,650 A | * | 5/1999 | Ross et al. .................... 705/59 |
| 5,991,399 A | | 11/1999 | Graunke et al. |
| 6,360,320 B1 | * | 3/2002 | Ishiguro et al. ............. 713/164 |
| 6,636,966 B1 | * | 10/2003 | Lee et al. ................... 713/165 |

FOREIGN PATENT DOCUMENTS

| | | |
|---|---|---|
| JP | 11-154944 | 6/1999 |
| JP | 11-265317 | 9/1999 |
| JP | 11-306673 | 11/1999 |
| JP | 2000-324096 | 11/2000 |
| WO | WO 98/42098 | 9/1998 |

OTHER PUBLICATIONS

Kiyoshi Yamanaka et al.; NTT R&D, vol. 44, No. 9, pp. 813-818, Sep. 10, 1995. See PCT search report.

Seigo Kotani et al.; Fujitsu, vol. 49, No. 3, pp. 246-249, May 1998. See PCT search report.

Partial translation of Ango Riron Nyumon (Introduction of Code Theory) Chapter 7—Authentication. 1993.

Partial translation of "Features Digital Copyrights" Nikkei Electronics, No. 739, Mar. 22, 1999.

Japanese Office Action.

* cited by examiner

FIG.2

| NAME | FUNCTION/CHARACTERISTICS | HOLD/ GENERATION POSITION |
|---|---|---|
| Data | CONTENT DATA: DISTRIBUTED AS ENCRYPTED CONTENT DATA ENCRYPTED TO ALLOW DECRYPTION WITH Kc AND TAKING THE FORM OF {Data}Kc | DISTRIBUTION SERVER |
| Data-inf | ADDITIONAL INFORMATION: PLAIN TEXT INFORMATION RELATING TO COPYRIGHT OF CONTENT DATA, SERVER ACCESS, ETC. | DISTRIBUTION SERVER |
| Kc | LICENSE KEY: DECRYPTION KEY FOR DECRYPTING ENCRYPTED CONTENT DATA | DISTRIBUTION SERVER |
| Kp(n)/Kmc(n) | PRIVATE DECRYPTION KEY UNIQUE TO CLASS OF CONTENT REPRODUCING CIRCUIT OR MEMORY CARD, n: IDENTIFIER OF CLASS | CELLULAR PHONE, MEMORY CARD |
| KPp(n)/KPmc(n) | ASYNCHRONOUS PUBLIC ENCRYPTION KEY DECODABLE WITH Kp(n)/Kmc(n),RECORDED IN THE FORM OF {Kp(n)}KPma/{KPmc(n)}KPma BEFORE SHIPMENT,DECRYPTED TO PRODUCE ADDITIONAL INFORMATION AUTHENTICATING DECRYPTED PUBLIC ENCRYPTION KEY Kp(n)/KPmc(n) n: IDENTIFIER OF CLASS | CELLULAR PHONE, MEMORY CARD |
| Kcom | DECRYPTION KEY SYMMETRIC TO REPRODUCING CIRCUIT, UTILIZED FOR DECRYPTION OF ENCRYPTED Kc AND AC2 (ASYMMETRIC DISTRIBUTION SERVER KPcom/REPRODUCTION CIRCUIT Kcom MAY BE USED.) | DISTRIBUTION SERVER, CELLULAR PHONE |
| KPma | AUTHENTICATION KEY | DISTRIBUTION SERVER |
| AC | PURCHASE CONDITIONS FOR LICENSE FROM USER SIDE (FUNCTION RESTRICTION, NUMBER OF LICENSE(S), ETC.) | CELLULAR PHONE |
| AC1 | RESTRICTION INFORMATION FOR MEMORY ACCESS | DISTRIBUTION SERVER |
| AC2 | CONTROL INFORMATION FOR REPRODUCING CIRCUIT | DISTRIBUTION SERVER |
| Km(i) | DECRYPTION KEY UNIQUE TO EACH MEMORY CARD (I: IDENTIFIER OF CARD) | MEMORY CARD |
| KPm(i) | ASYMMETRIC ENCRYPTION KEY DECODABLE WITH Km(i) | MEMORY CARD |
| K(i) | SYMMETRIC ENCRYPTION KEY UNIQUE TO MEMORY (i: IDENTIFIER OF CARD) | MEMORY CARD |
| Ks1 | SYMMETRIC KEY UNIQUE TO SESSION, GENERATED IN EVERY DISTRIBUTION SESSION | DISTRIBUTION SERVER |
| Ks2 | SYMMETRIC KEY UNIQUE TO SESSION, GENERATED IN EVERY DISTRIBUTION/TRANSFER (RECEIVING) SESSION | MEMORY CARD |
| Ks3 | SYMMETRIC KEY UNIQUE TO SESSION, GENERATED IN EVERY REPRODUCTION/TRANSFER (SENDING) SESSION | MEMORY CARD |
| Ks4 | SYMMETRIC KEY UNIQUE TO SESSION, GENERATED IN EVERY REPRODUCTION SESSION | CELLULAR PHONE |
| CONTENT ID | CODE FOR IDENTIFYING CONTENT DATA Data | DISTRIBUTION SERVER |
| LICENSE ID | ADMINISTRATION CODE FOR SPECIFYING ISSUANCE OF LICENSE (DETERMINED TOGETHER WITH CONTENT ID IN SOME CASES) | DISTRIBUTION SERVER |
| TRANSACTION ID | CODE PRODUCED IN EVERY DISTRIBUTION SESSION FOR SPECIFYING DISTRIBUTION SESSION (THIS MAY ALSO SERVE AS LICENSE ID.) | DISTRIBUTION SERVER |

FIG.6

|  | CONTENT ID | LICENSE ID | AC1 |
|---|---|---|---|
| BANK1 | | | |
| BANK2 | | | |
| BANK3 | | | |
| ⋮ | ⋮ | ⋮ | ⋮ |
| BANKN | | | |

FIG.22

| NAME | FUNCTION/CHARACTERISTICS | HOLD/ GENERATION POSITION |
|---|---|---|
| Data | CONTENT DATA: DISTRIBUTED AS ENCRYPTED CONTENT DATA ENCRYPTED TO ALLOW DECRYPTION WITH Kc AND TAKING THE FORM OF [Data]Kc | DISTRIBUTION SERVER |
| Data-inf | ADDITIONAL INFORMATION: PLAIN TEXT INFORMATION RELATING TO COPYRIGHT OF CONTENT DATA, SERVER ACCESS, ETC. | DISTRIBUTION SERVER |
| Kc | LICENSE KEY: DECRYPTION KEY FOR DECRYPTING ENCRYPTED CONTENT DATA | DISTRIBUTION SERVER |
| Kp(n)/Kmc(n) | PRIVATE DECRYPTION KEY UNIQUE TO CLASS OF CONTENT REPRODUCING CIRCUIT OR MEMORY CARD, n: IDENTIFIER OF CLASS | CELLULAR PHONE, MEMORY CARD |
| KPp(n)/KPmc(n) | ASYNCHRONOUS PUBLIC ENCRYPTION KEY DECODABLE WITH Kp(n)/Kmc(n),RECORDED IN THE FORM OF {Kp(n)}KPma/{KPmc(n)}KPma BEFORE SHIPMENT,DECRYPTED TO PRODUCE ADDITIONAL INFORMATION AUTHENTICATING DECRYPTED PUBLIC ENCRYPTION KEY Kp(n)/KPmc(n) n: IDENTIFIER OF CLASS | CELLULAR PHONE, MEMORY CARD |
| KPma | AUTHENTICATION KEY | DISTRIBUTION SERVER |
| AC | PURCHASE CONDITIONS FOR LICENSE FROM USER SIDE (FUNCTION RESTRICTION, NUMBER OF LICENSE(S), ETC.) | CELLULAR PHONE |
| AC1 | RESTRICTION INFORMATION FOR MEMORY ACCESS | DISTRIBUTION SERVER |
| AC2 | CONTROL INFORMATION FOR REPRODUCING CIRCUIT | DISTRIBUTION SERVER |
| Km(i) | DECRYPTION KEY UNIQUE TO EACH MEMORY CARD (I: IDENTIFIER OF CARD) | MEMORY CARD |
| KPm(i) | ASYMMETRIC ENCRYPTION KEY DECODABLE WITH Km(i) | MEMORY CARD |
| K(i) | SYMMETRIC ENCRYPTION KEY UNIQUE TO MEMORY (i: IDENTIFIER OF CARD) | MEMORY CARD |
| Ks1 | SYMMETRIC KEY UNIQUE TO SESSION, GENERATED IN EVERY DISTRIBUTION SESSION | DISTRIBUTION SERVER |
| Ks2 | SYMMETRIC KEY UNIQUE TO SESSION, GENERATED IN EVERY DISTRIBUTION/TRANSFER (RECEIVING) SESSION | MEMORY CARD |
| Ks3 | SYMMETRIC KEY UNIQUE TO SESSION, GENERATED IN EVERY REPRODUCTION/TRANSFER (SENDING) SESSION | MEMORY CARD |
| Ks4 | SYMMETRIC KEY UNIQUE TO SESSION, GENERATED IN EVERY REPRODUCTION SESSION | CELLULAR PHONE |
| CONTENT ID | CODE FOR IDENTIFYING CONTENT DATA Data | DISTRIBUTION SERVER |
| LICENSE ID | ADMINISTRATION CODE FOR SPECIFYING ISSUANCE OF LICENSE (DETERMINED TOGETHER WITH CONTENT ID IN SOME CASES) | DISTRIBUTION SERVER |
| TRANSACTION ID | CODE PRODUCED IN EVERY DISTRIBUTION SESSION FOR SPECIFYING DISTRIBUTION SESSION (THIS MAY ALSO SERVE AS LICENSE ID.) | DISTRIBUTION SERVER |

RECORDER

TECHNICAL FIELD

The present invention relates to a recording device such as a memory card, which allows protection of copyright of copied information, in a distribution system for distributing information to terminals such as cellular phones.

BACKGROUND ART

Owing to progress in information communication networks such as Internet in recent years, users can easily access network information through personal terminals employing cellular phones or the like.

In such information communication, information is transmitted as digital signals. Therefore, each user can copy music data and video data, which are transmitted via the information communication network, without degradation in the audio quality and picture quality.

Accordingly, the right of the copyright owner may be significantly infringed when copyrighted content data such as music information and image data are transmitted over the information communication network without appropriate measures for protecting the copyrights.

Conversely, top priority may be given to the copyright protection by disabling or inhibiting distribution of content data over the digital information communication network, which is growing exponentially. However, this causes disadvantages to the copyright owner who can essentially collect a predetermined copyright royalty for data copying.

Instead of the distribution over the digital information communication network described above, distribution may be performed via record mediums storing digital data. In connection with the latter case, music data stored in CDs (Compact Disks) on the market can be freely copied in principle onto magneto-optical disks (e.g., MDs) as long as the copied music is only for the personal use. However, a personal user performing digital recording or the like indirectly pays predetermined amounts in prices of the digital recording device itself and the mediums such as MDs as guaranty moneys to a copyright owner.

Further, the music data is digital data formed of digital signals, and substantially no deterioration occurs in copied information when music data is copied from a CD to an MD. Therefore, for the copyright protection, such structures are employed that the music information cannot be copied as digital data from the recordable MD to another MD.

In view of the above, it is necessary to inhibit unauthorized further duplication of the received content data, which was distributed to the public over the information communication network.

DISCLOSURE OF THE INVENTION

An object of the invention is to provide a recording device, and particularly to provide a memory card for receiving information in an information distribution system, which distributes content data or information over an information communication network of cellular phones or the like.

Another object of the invention is to provide a data distribution system, which can prevent duplication of content data without authorization from a copyright owner, as well as a recording device and particularly a memory card used in such data distribution system.

Still another object of the invention is to provide a recording device, and particularly to provide a memory card, which can improve security in an information distribution system and allows fast reproduction processing of content data.

For achieving the above objects, the invention provides a recording device for receiving and recording a license key encrypted with a first public encryption key predetermined with respect to the recording device and used for decrypting encrypted content data, including a first key holding portion, a first decryption processing portion, a second key holding portion, a first encryption processing portion, a recording portion and a second decryption processing portion.

The first key holding portion holds a first private decryption key being asymmetric to the first public encryption key and used for decrypting data encrypted with the first public encryption key. The first decryption processing portion receives the license key encrypted with the first public encryption key, and decrypts the received data with the first secret decryption key. The second key holding portion holds at least one secret unique key being unique to the recording device and being symmetric in a symmetric key cryptosystem. The first encryption processing portion receives the output of the first encryption processing portion, and encrypts the license key with the sectret unique key. The first recording portion receives and stores the output of the first encryption processing portion. The second decryption processing portion decrypts the license key stored in the recording portion with the encrypted secret unique key.

According to the distribution system using the recording device of the invention, a license key or the like, which is distributed after being encrypted in the public key cryptosystem with an asymmetric key, is held in the memory card after being re-encrypted with the secret symmetric key unique to the memory card in the symmetric key cryptosystem allowing fast decryption. In the reproduction processing of music data corresponding to the encrypted content data, therefore, the decryption processing can be performed fast on the license key, which is information required for the reproduction processing.

Further, a level of security can be improved by using the key for data sending, which is different from the key for storage in the memory card.

BRIEF DESCRIPTION OF THE DRAWINGS

FIG. 2 represents characteristics of data, information and others used for communication in the data distribution system shown in FIG. 1;

FIG. 6 conceptually shows allocation of storage regions in a license information holding portion 1440 shown in FIG. 5;

FIG. 22 represents characteristics of data, information and others used for communication in a data distribution system according to a fourth embodiment;

BEST MODE FOR CARRYING OUT THE INVENTION

Embodiments of the invention will now be described with reference to the drawings.

[First Embodiment]

Figure 1:
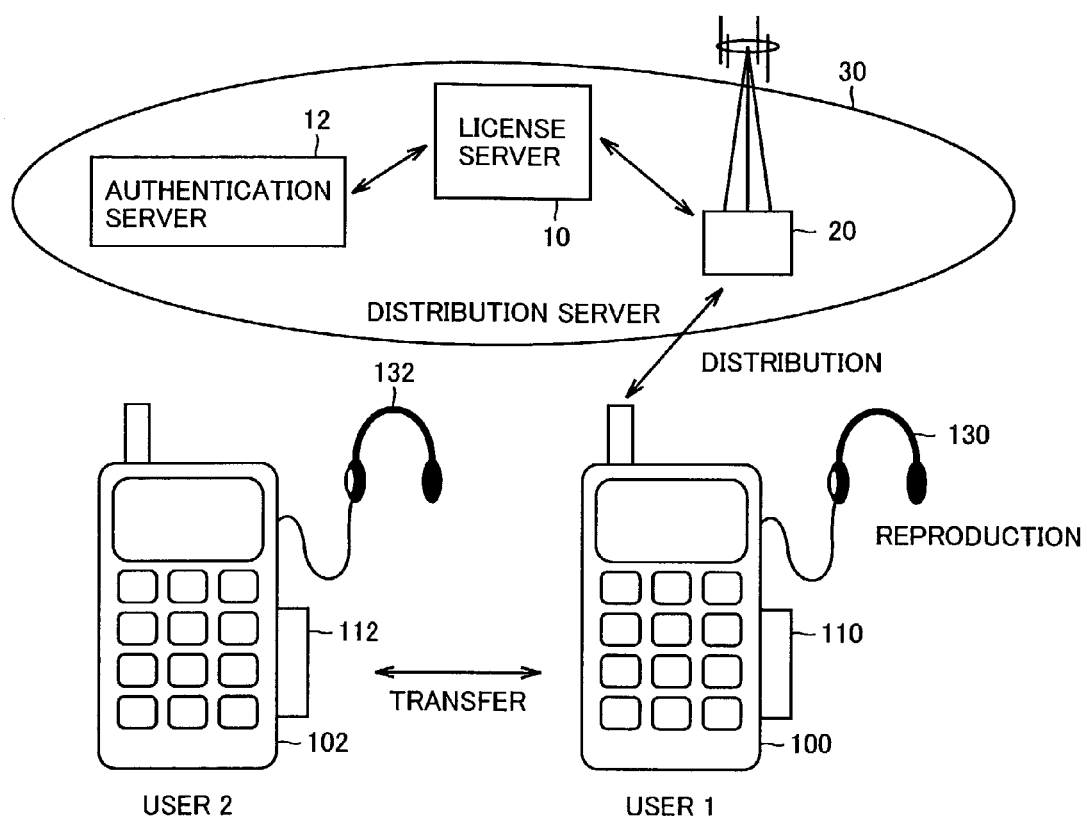
FIG. 1 conceptually shows a whole structure of a data distribution system according to the invention.

FIG. 1 conceptually shows a whole structure of a data distribution system according to the invention.

The following description will be given by way of example on a structure of a data distribution system, in which music data is distributed to users over a cellular phone network. As will be apparent from the following description, the invention is not restricted to such an example, and may be applied to other cases, in which content data such as image data is distributed over another information communication network.

Referring to FIG. 1, a license server 10 administrating copyrighted music information encrypts music data (which will be also referred to as "content data" hereinafter) in a predetermined encryption manner, and applies the data thus encrypted to a cellular phone company, which is a distribution carrier 20 for distributing information. An authentication server 12 determines whether a cellular phone and a memory card of a user, who made access for requesting for distribution of the music data, are regular devices or not.

Distribution carrier 20 relays over its own cellular phone network the distribution request received from each user to license server 10. When license server 10 receives the distribution request, authentication server 12 determines whether the cellular phone and memory card of the user are regular devices or not. After it is confirmed that these are regular devices, license server 10 encrypts the requested content data, and distributes it to the user's cellular phone over the cellular phone network of distribution carrier 20.

In FIG. 1, a cellular phone 100 of a user 1 includes, e.g., a memory card 110, which is releasably attached thereto. Memory card 110 receives encrypted content data received by cellular phone 100, decrypts the data encrypted for the transmission, and applies the data to a music reproducing unit (not shown) in cellular phone 100.

Further, user 1 can listen to music, which is produced by reproducing such content data, via headphones 130 or the like connected to cellular phone 100.

In the following description, license server 10, authentication server 12 and distribution carrier (cellular phone company) 20 described above will be collectively referred to as a "distribution server 30" hereinafter.

Also, the processing of transmitting the content data from distribution server 30 to each cellular phone or the like will be referred to as "distribution" hereinafter.

Owing to the above structure, a user other than a regular user, who purchased a regular cellular phone and a regular memory card, cannot receive and reproduce the data distributed from distribution server 30 without difficulty.

Further, the system may be configured as follows. By counting the times of distribution of content data, e.g., for one song in distribution carrier 20, the royalty, which is charged every time the user receives the distributed content data, can be collected by distribution carrier 20 together with charges for telephone calls so that the copyright owner can easily ensure the royalty.

The foregoing distribution of the content data is performed over a closed system, i.e., the cellular phone network so that it is easy to take measures for the copyright protection, compared with open systems such as the Internet.

For example, a user 2 having a memory card 112 can receive content data directly from distribution server 30 by user's own cellular phone 102. However, such data reception may take a relatively long time if user 2 receives the content data or the like having a large information amount directly from distribution server 30. In connection with this, the system may be configured such that user 2 can copy the content data of user 1, who has already received it. This improves the convenience of users.

From the viewpoint of protecting right of the copyright owner, it is not allowed to provide a system configuration allowing free copying of content data.

In an example shown in FIG. 1, an operation, in which the content data itself received by user 1 is copied, and reproduction information required for reproducing the content data of user 1 is moved or transferred to user 2, is referred to as "transfer" of the music data. In this case, the encrypted content data and the reproduction information required for the reproduction are transferred between memory cards 110 and 112 via cellular phones 100 and 102. As will be described later, the above "reproduction information" has a license key, which allows decryption or decoding of the content data encrypted in accordance with the predetermined encryption scheme, as well as license information such as a license ID and information relating to restrictions on access and reproduction.

In contrast to the "transfer", an operation of copying content data itself is referred to as "duplication". In the duplication, reproduction information required is not duplicated so that user 2 content data cannot reproduce the content data. Although not described in detail, user 2 can reproduce the content data by performing additional distribution of only the reproduction information including the license key.

Owing to the above structures, a user who received the content data from distribution server 30 can flexibly utilize the data.

If cellular phones 100 and 102 are PHSs (Personal Handy Phones), a telephone conversation can be performed in a so-called transceiver mode. By using this function, information can be transferred between users 1 and 2.

In the structure shown in FIG. 1, the system requires the following schemes and structure for reproducing the content data, which is distributed in the encrypted form, on the user side. First, the system requires a scheme for distributing an encryption key in the communication. Second, the system requires a scheme for encrypting the data itself to be distributed. Third, the system requires a structure for protecting data by preventing unauthorized copying of the distributed data.

In the embodiment of the invention, when each of sessions of distribution and reproduction occurs, the destination or receiver of the content data is verified and checked sufficiently. Therefore, it is possible to prevent the distribution or transfer of the data to the recording device and content reproducing device (e.g., cellular phone), which are not authenticated, and thereby the copyright of the distributed data can be protected more reliably. The embodiment will now be described particularly in connection with the structure for enhancing such verifying and checking functions.

[Structures of Data and Keys in System]

FIG. 2 collectively represents characteristics of keys relating to encryption for communication in the data distribution system shown in FIG. 1 as well as data and others to be distributed.

First, "Data" represent content data such as music data distributed from the distribution server. As will be described later, content data Data distributed from distribution server 30 takes a form of encrypted content data {Data}Kc, which is encrypted to allow decryption at least with a license key Kc.

In the following description, expression "{Y}X" represents that the data indicated by this expression was prepared by converting data Y into an encrypted form decodable with a decryption key X.

Together with the content data, distribution server 30 distributes additional information data Data-inf in plain text, which relates to a copyright of the content data, server access and others. More specifically, additional information data Data-inf includes information for specifying a song title, an artist name and others of the content data, and also includes information for specifying distribution server 30 and other information.

The following keys are used for encryption, decryption and reproduction of the content data as well as for authentication of the content reproducing circuit (i.e., cellular phone) and the recording device (i.e., memory card).

As already described, license key Kc is used for decrypting and encrypting the content data. Also, public encryption key KPp(n) unique to the content reproducing circuit (cellular phone 100) and public encryption key KPmc(n) unique to the memory card are used.

The data encrypted with public encryption keys KPp(n) and KPmc(n) can be decrypted with private decryption key Kp(n) unique to the content reproducing circuit and private decryption key Kmc(n) unique to the memory card individually. These unique public decryption key and private decryption key for each cellular phone or each memory card have contents different from those of the other kinds of cellular phones or the other kinds of memory cards. These kinds of the cellular phones and memory cards depend on respective units, which are determined based on kinds of manufacturers of them, manufacturing dates or periods (manufacturing lots) and others. These units will be referred to as "classes" hereinafter. The natural number "n" is added for identifying the class of each memory card and each content reproducing circuit (cellular phone).

As a secret common key common to all the content reproducing circuit, the system employs a secret common key Kcom, which is primarily utilized for obtaining license key Kc and restriction information for the content reproducing circuit to be described later, as well as an authentication key KPma operated commonly in whole the distribution system. Secret key Kcom is a decryption key in the symmetric key cryptosystem, and therefore is held as the encryption key in the distribution server.

Encryption keys KPmc(n) and KPp(n), which are determined depending on the memory card and the content reproducing circuit as described above, are recorded in the memory card and the cellular phone before shipment, respectively. Keys KPmc(n) and KPp(n) thus recorded take the forms of authentication data {KPmc(n)}KPma and {KPp(n)}KPma, which are signed data allowing authentication or verification by decryption with authentication key KPma.

Secret common key Kcom common to the content reproducing device is not restricted to the symmetric key in the symmetric key cryptosystem, and may be private decryption key in the public key cryptosystem. In the latter case, the distribution server holds public encryption key KPcom, which is paired with and is asymmetric to this private decryption key Kcom, as an encryption key.

Further, the system uses information for controlling operations of the devices forming the system, i.e., devices such as cellular phone 100 (i.e., content reproducing circuit) and memory card 110, and the above information includes purchase conditions information AC, which is sent from cellular phone 100 to distribution server 30 for designating purchase conditions when the user purchases the license key or the like, access restriction information AC1, which is distributed from distribution server 30 to memory card 110 in accordance with purchase condition information AC for representing conditions for access to license key Kc recorded in memory card 110, and reproducing circuit restriction information AC2, which is distributed from distribution server 30 to cellular phone 100 for representing restrictions on the reproduction conditions of the content reproducing circuit. The access conditions define, for example, allowed times of access to license key Kc for reproduction (i.e., allowed times of reproduction) as well as specific conditions such as inhibition of duplication and/or transfer of license key Kc. For example, the reproduction conditions of the content reproducing circuit relate to conditions, which are used when a sample of a new song is distributed at a low price or no charge for sales promotion, and allow reproduction from the start of the content data only for a limited time or reproduction only for a limited period.

As keys for administering the data in memory card 110, the system employs private encryption key KPm(i) (i: natural number) determined uniquely to each recording device, i.e., memory card, private decryption key Km(i), which is unique to each memory card and allows decryption of the data encrypted with private encryption key KPm(i), and secret symmetric key K(i) unique to the memory card. The natural number "i" is added for identifying each memory card from the others.

Further, the data distribution system shown in FIG. 1 uses the following keys and others in the data communication.

As the encryption keys for keeping secrecy in the data transmission from and into the memory card, the system uses symmetric keys Ks1–Ks4, which are produced by cellular phone 100 or 102, and memory card 110 or 112 upon every distribution, reproduction and transfer of the content data.

Symmetric keys Ks1–Ks4 are unique symmetric keys, and are generated in response to every "session", which is a unit of communication or access between or to the distribution server, cellular phone and/or memory card. These symmetric keys Ks1–Ks4 will be referred to as "session keys" hereinafter.

More specifically, the license server in the distribution server generates session key Ks1 in response to every distribution session. The memory card generates session key Ks2 in response to every distribution session and every transfer session (receiving side). The memory card likewise generates session key Ks3 in response to every reproduction session and every transfer session (sending side). The cellular phone generates session key Ks 4 in response to every reproduction session. In each session, these session keys are exchanged, and the session key produced by the device on the receiving side is received, and is used for encrypting the license key therewith, and then the license key and others thus encrypted are sent so that the security level in the sessions can be improved.

Further, the data transmitted between the distribution server and the cellular phone includes a content ID, by which the system identifies the content data, a license ID which is an administration code for specifying the time and the receiver of the issued license, and a transaction ID which is a code produced in response to every distribution session for specifying each distribution session. The license ID may also serve as the transaction ID.

The license ID, content ID and access restriction information AC1 are collectively referred to as "license information", and this license information, license key Kc and reproducing circuit restriction information AC2 are collectively referred to as "reproduction information".

[Structure of License Server 10]

Figure 3:
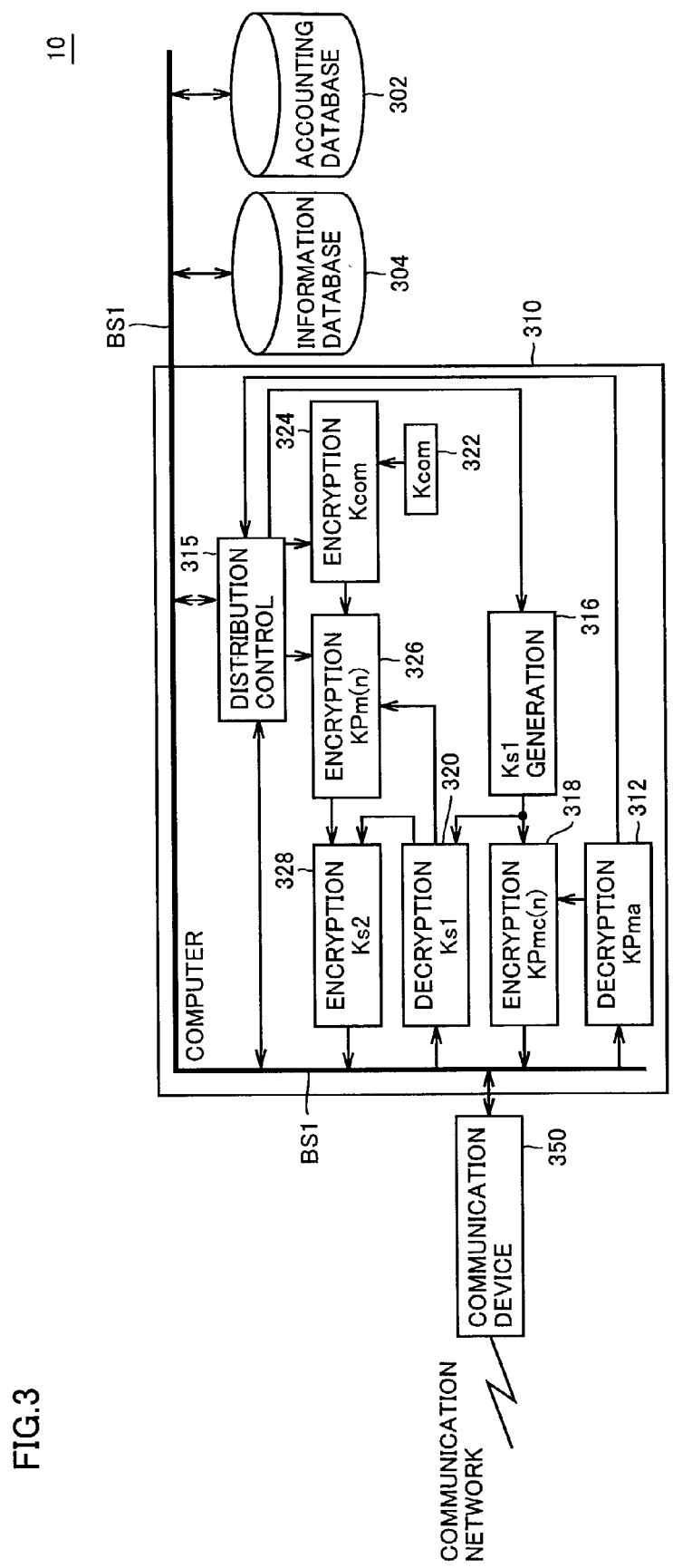
FIG. 3 is a schematic block diagram showing a structure of a license server 10.

FIG. 3 is a schematic block diagram showing a structure of license server 10 shown in FIG. 1.

License server 10 includes an information database 304 which holds data for distributing the content data prepared by encrypting the music data (content data) in accordance with a predetermined scheme as well as the reproduction information, an accounting database 302 for holding accounting data according to start of access to the music data for each user, a data processing portion 310, which receives data from information database 304 and accounting database 302 via a data bus BS1, and performs predetermined processing, and a communication device 350 for performing data transmission between distribution carrier 20 and data processing portion 310 over a communication network.

Data processing portion 310 includes a distribution control portion 315 for controlling an operation of data processing portion 310 in accordance with data on data bus BS1, a session key generating portion 316 for generating session key Ks1 during the distribution session under control of distribution control portion 315, a decryption processing portion 312 for receiving authentication data {KPmc(n)}KPma and {KPp(n)}KPma, which are sent from the memory card and the cellular phone for authentication, respectively, via communication device 350 and a data bus BS2, and decrypting it with authentication key KPma, an encryption processing portion 318, which encrypts session key Ks1 produced by session key generating portion 316 with public encryption key KPmc(n) obtained by decryption processing portion 312, and outputs the encrypted key onto data bus BS1, and a decryption processing portion 320 for receiving the data, which is encrypted with session key Ks1 on each user side and is sent therefrom, via data bus BS1 and decrypting the same.

Data processing portion 310 further includes a Kcom holding portion 322 for holding secret common key Kcom common to all the content reproducing circuit as an encryption key, an encryption processing portion 324 for encrypting license key Kc and reproducing circuit restriction information AC2 applied from distribution control portion 315 with encryption key KPcom symmetric to the reproducing circuit, an encryption processing portion 326 for encrypting the data sent from encryption processing portion 324 with public encryption key KPm(i), which is obtained by decryption processing portion 320 and is unique to the memory card, and an encryption processing portion 328 for further encrypting the output of encryption processing portion 326 with session key Ks2 applied from decryption processing portion 320, and outputting the same onto data bus BS1.

In the structure described above, license server 10 utilizes secret common key Kcom in common with the cellular phone side in the symmetric key cryptosystem as the encryption key. According to the public key cryptosystem, however, Kcom holding portion 322 holds not secret common key Kcom but public encryption key KPcom, which is asymmetric to secret common key Kcom and can encrypt into a form decodable with secret common key Kcom on the cellular phone side.

[Structure of Cellular Phone 100]

Figure 4:
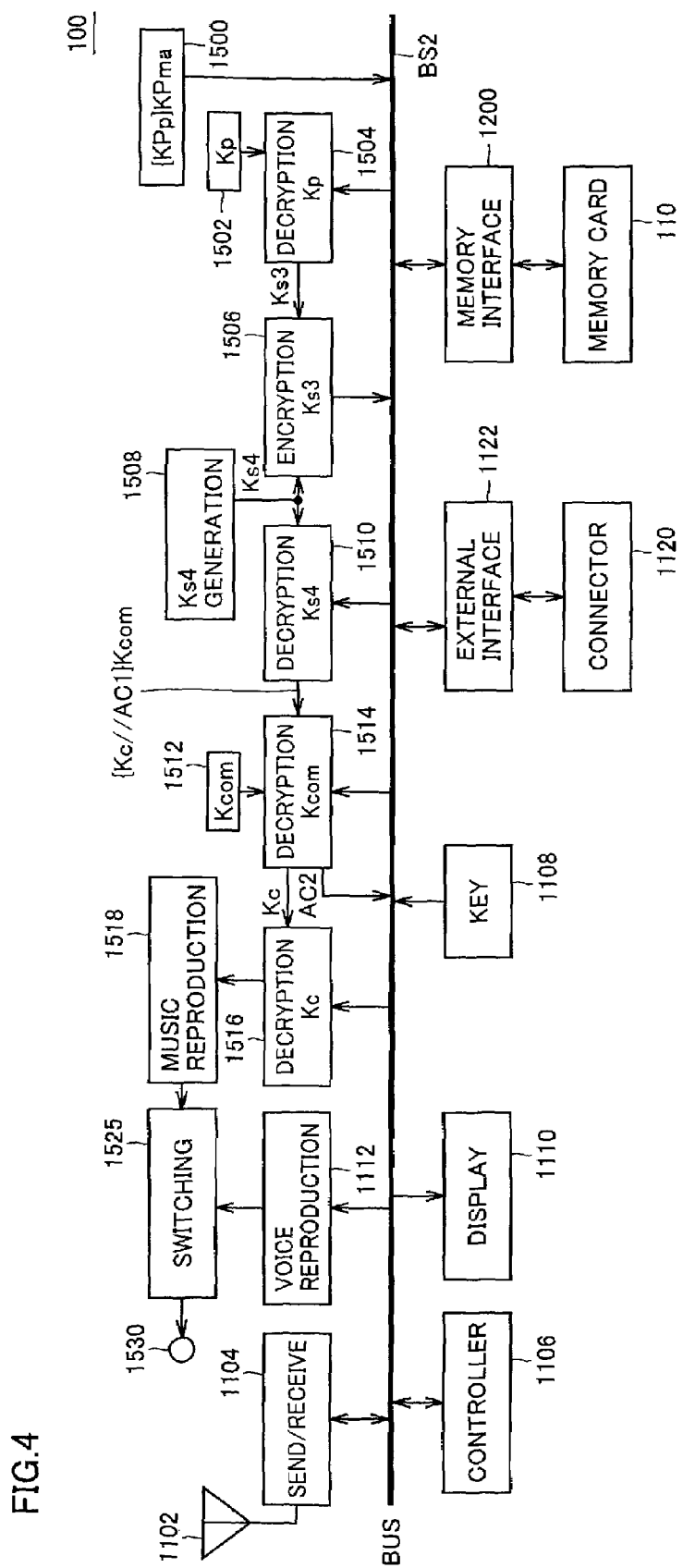
FIG. 4 is a schematic block diagram showing a structure of a cellular phone 100.

FIG. 4 is a schematic block diagram showing a structure of cellular phone 100 shown in FIG. 1.

In cellular phone 100, natural number n representing the class is equal to one.

Cellular phone 100 has an antenna 1102 for receiving radio signals sent over the cellular phone network, a send/receive portion 1104 for converting the signals received from antenna 1102 into baseband signals, and for modulating data sent from cellular phone 100 and sending it to antenna 1102, data bus BS2 for data transmission between various portions in cellular phone 100, and a controller 1106 for controlling operations of cellular phone 100 via data bus BS2.

Cellular phone 100 further includes a touch key unit 1108 for externally applying instructions to cellular phone 100, a display 1110 for giving information sent from controller 1106 or the like to the user as visible information, a voice reproducing portion 1112 for operating in an ordinary conversation operation to reproduce a voice from the received data sent via data bus BS2, a connector 1120 for external data transmission, and an external interface portion 1122, which can convert the data sent from connector 1120 into signals to be applied onto data bus BS2, and can convert the data applied from data bus BS2 into signals to be applied to connector 1120.

Cellular phone 100 further includes removable memory card 110 for storing and decrypting content data (music data) sent from distribution server 30, a memory interface 1200 for controlling transmission of data between memory card 110 and data bus BS2, and an authentication data holding portion 1500 for holding authentication data {KPp(1)}KPma, which allows authentication of public encryption key KPp(1) set uniquely to each class of the cellular phone by decryption with authentication key KPma.

Cellular phone 100 further includes a Kp holding portion 1502 for holding private decryption key Kp(n) (n=1) unique to the cellular phone (content reproducing circuit), a decryption processing portion 1504 for decrypting the data received from data bus BS2 with private decryption key Kp(1) to obtain session key Ks3 generated by the memory card, a session key generating portion 1508 for generating session key Ks4, e.g., based on a random number for encrypting the data to be transmitted via data bus BS2 between cellular phone 100 and memory card 110 in the reproduction session for reproducing the content data stored in memory card 110, an encryption processing portion 1506 for encrypting session key Ks4 thus produced with session key Ks3 obtained by decryption processing portion 1504, and outputting the encrypted key onto data bus BS2, and a decryption processing portion 1510 for decrypting the data on data bus BS2 with session key Ks4 to output data {Kc//AC2}Kcom.

Cellular phone 100 further includes a Kcom holding portion 1512 for holding secret common key Kcom, that common to all the content reproducing circuit, a decryption processing portion 1514 for decrypting data {Kc//AC2}Kcom output from decryption processing portion 1510 with secret common key Kcom, and outputting license key Kc and reproduction circuit restriction information AC2, a decryption processing portion 1516 for receiving encrypted content data {Data}Kc from data bus BS2, and decrypting it with license key Kc obtained from decryption processing portion 1514 to output the content data, a music reproducing portion 1518 for receiving the output of decryption processing portion 1516 and reproducing the content data, a selector portion 1525 for receiving the outputs of music reproducing portion 1518 and voice reproducing portion 1112, and selectively outputting them depending on the operation mode, and a connection terminal 1530 for receiving the output of selector portion 1525 and allowing connection of head phones 130.

Reproduction circuit restriction information AC2 output from decryption processing portion 1514 is applied to controller 1106 via data bus BS2.

FIG. 4 shows only some of blocks forming the cellular phone for the sake of simplicity, and particularly shows only blocks relating to the distribution and reproduction of music data according to the invention. Some of blocks related to an original conversation function of the cellular phone are not shown.

[Structure of Memory Card 110]

Figure 5:
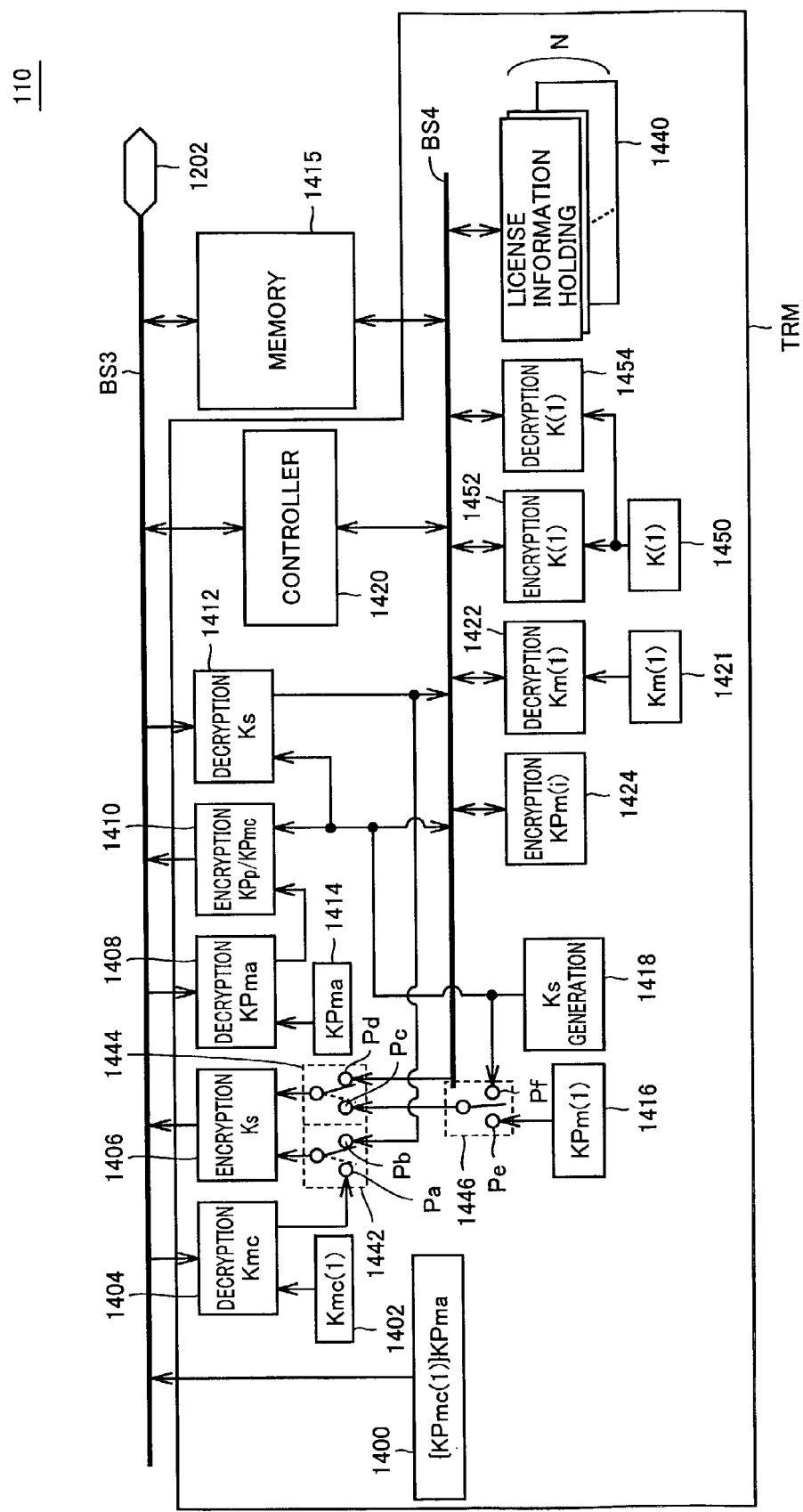
FIG. 5 is a schematic block diagram showing a structure of a memory card 110.

FIG. 5 is a schematic block diagram showing a structure of memory card 110 shown in FIG. 4.

As already described, public encryption key KPm(i) and corresponding private decryption key Km(i) have values unique to each memory card. In the following description, it is assumed that natural number i is equal to one (i=1) in memory card 110. Further, keys KPmc(n) and Kmc(n) are employed as public encryption key and private decryption key unique to the class of the memory card, respectively. It is also assumed that natural number n is equal to one (n=1) in memory card 110.

Memory card 110 includes an authentication data holding portion 1400 for holding {KPmc(1)}KPma as the authentication data, a Kmc holding portion 1402 for holding private decryption key Kmc(1) unique to each class of the memory card, a KPm(1) holding portion 1416 for holding public encryption key KPm(1) unique to each memory card, a Km(1) holding portion 1421 for holding private decryption key Km(1) allowing decryption of the data encrypted with public encryption key KPm(1), and a K(1) holding portion 1450 for holding secret symmetric key K(1) unique to the memory card. Authentication data holding portion 1400 holds authentication data {KPmc(1)}KPma, which can be decrypted with authentication key KPma to allow authentication of public encryption key KPmc(1) set uniquely to the class of memory card.

Memory card 110 further includes a data bus BS3 for transmitting signals to and from memory interface 1200 via a terminal 1202, a decryption processing portion 1404 for receiving the data, which is applied onto data bus BS3 from memory interface 1200, and private decryption key Kmc(1) unique to the class of memory card sent from Kmc(1) holding portion 1402, and outputting session key Ks1, which is produced by distribution server 30 in the distribution session, or session key Ks3, which is produced by another memory card in the transfer session, to contact Pa, a decryption processing portion 1408 for receiving authentication key KPma from a KPma holding portion 1414, and performing decryption on the data applied from data bus BS3 with authentication key KPma to apply results of the decryption to a controller 1420 and decryption processing portion 1410 via data bus BS4, and an encryption processing portion 1406 for encrypting data, which is selectively applied by a select switch 1444, with the key selectively applied by a select switch 1442, and outputting the encrypted data onto data bus BS3.

Memory card 110 further includes a session key generating portion 1418 for generating session key Ks2 or Ks3 in each of distribution, reproduction and transfer sessions, an encryption processing portion 1410 for encrypting session key Ks3 generated from session key generating portion 1418 with public encryption key KPp(n) or KPmc(n) obtained by decryption processing portion 1408, and outputting the key thus encrypted onto data bus BS3, and a decryption processing portion 1412 for receiving the data encrypted with session key Ks2 or Ks3 from data bus BS3, and decrypting it with session key Ks2 or Ks3 obtained from session key generating portion 1418 to send results of the decryption onto data bus BS4.

Memory card 110 further includes an encryption processing portion 1424 for encrypting the data on data bus BS4 with public encryption key KPm(i) (i≠1) unique to another memory card in the transfer session, a decryption processing portion 1422 for decrypting the data on data bus BS4 with private decryption key Km(1), which is unique to memory card 110 and is paired with public encryption key KPm(1), an encryption processing portion 1452 for encrypting the data on data bus BS4 with private key K(1), a decryption processing portion 1454 for decrypting the data on data bus BS4 with private key K(1), and a memory 1415 for receiving and storing license key Kc and the reproduction information (content ID, license ID, access restriction information AC1 and reproducing circuit restriction information AC2), which are encrypted with public encryption key KPm(1) and are sent from data bus BS4, and for receiving and storing encrypted content data {Data}Kc and additional information Data-inf sent from data bus BS3. Memory 1415 is formed of, e.g., a semiconductor memory such as a flash memory, although not restricted thereto.

Memory card 110 further includes a license information holding portion 1440 for holding the license ID, content ID and access restriction information AC1 obtained by decryption processing portion 1422, and a controller 1420 for externally transmitting data via data bus BS3, receiving the reproduction information and others from data bus BS4 and controlling the operation of memory card 110.

A region surrounded by solid line in FIG. 5 is arranged within a module TRM, which is configured to erase internal data or destroy internal circuits for disabling reading of data and others in the circuits within this region by a third party when an illegal or improper access to the inside of memory card 110 is externally attempted. This module is generally referred to as a "tamper resistance module".

Naturally, memory 1415 may be located within module TRM. According to the structure shown in FIG. 5, however, the data held in memory 1415 is entirely encrypted so that a third party cannot reproduce the music only from the data in memory 1415, and further, it is not necessary to located memory 1415 within the expensive tamper resistance module. Therefore, the structure in FIG. 5 can reduce a manufacturing cost.

FIG. 6 shows allocation of storage regions in license information holding portion 1440 shown in FIG. 5.

License information holding portion 1440 can transmit the license ID, content ID and access restriction information AC1 to and from data bus BS4. License information holding portion 1440 has banks of N (N: natural number) in number, and reproduction information pieces corresponding to different licenses are held in the different banks, respectively.

[Distributing Operation]

Operations in the respective sessions of the data distribution system according to the embodiment of the invention will now be described in greater detail with reference to flowcharts.

Figure 7:
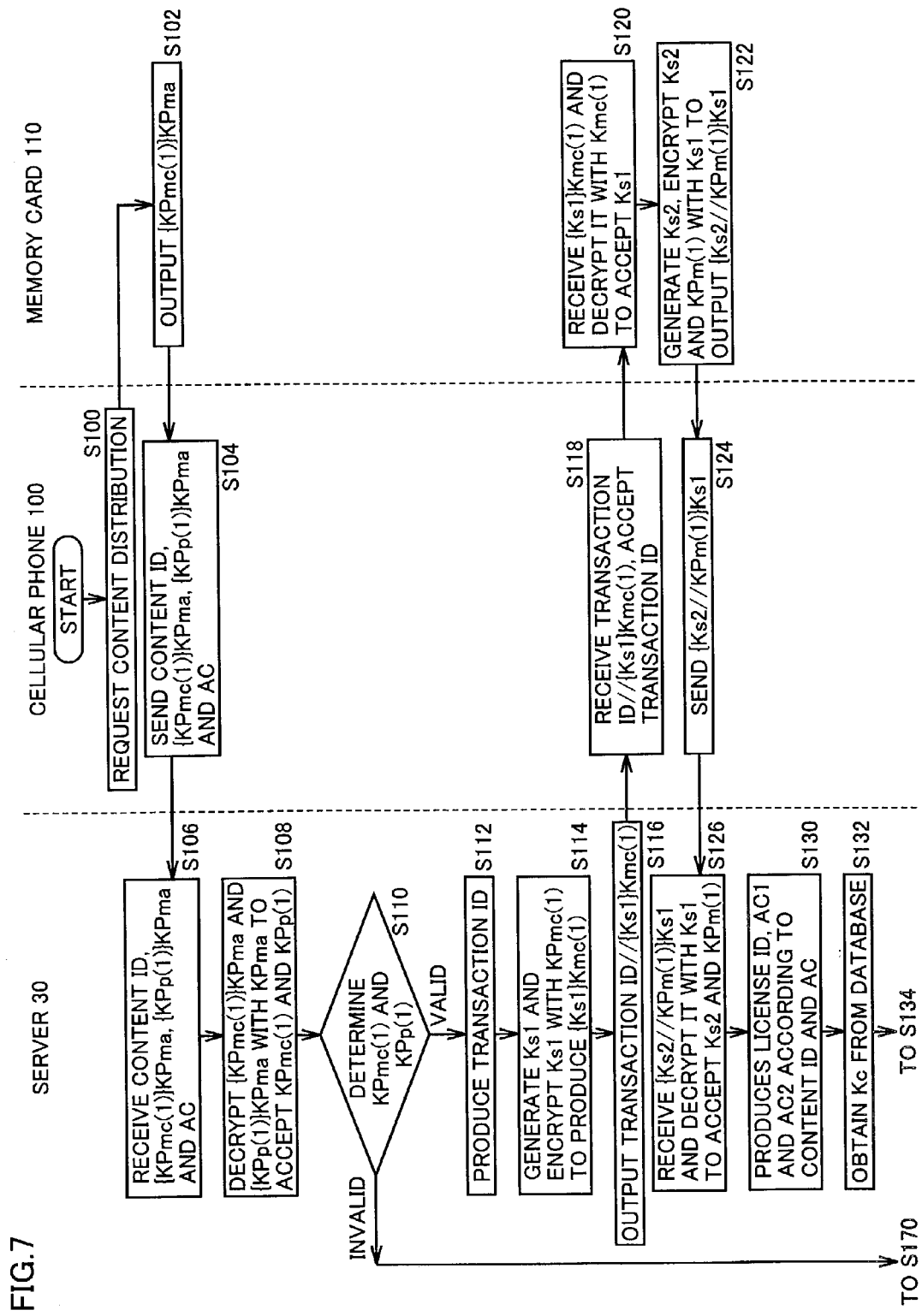
FIG. 7 is a first flowchart representing a distributing operation in the data distribution system according to the first embodiment.
Figure 8:
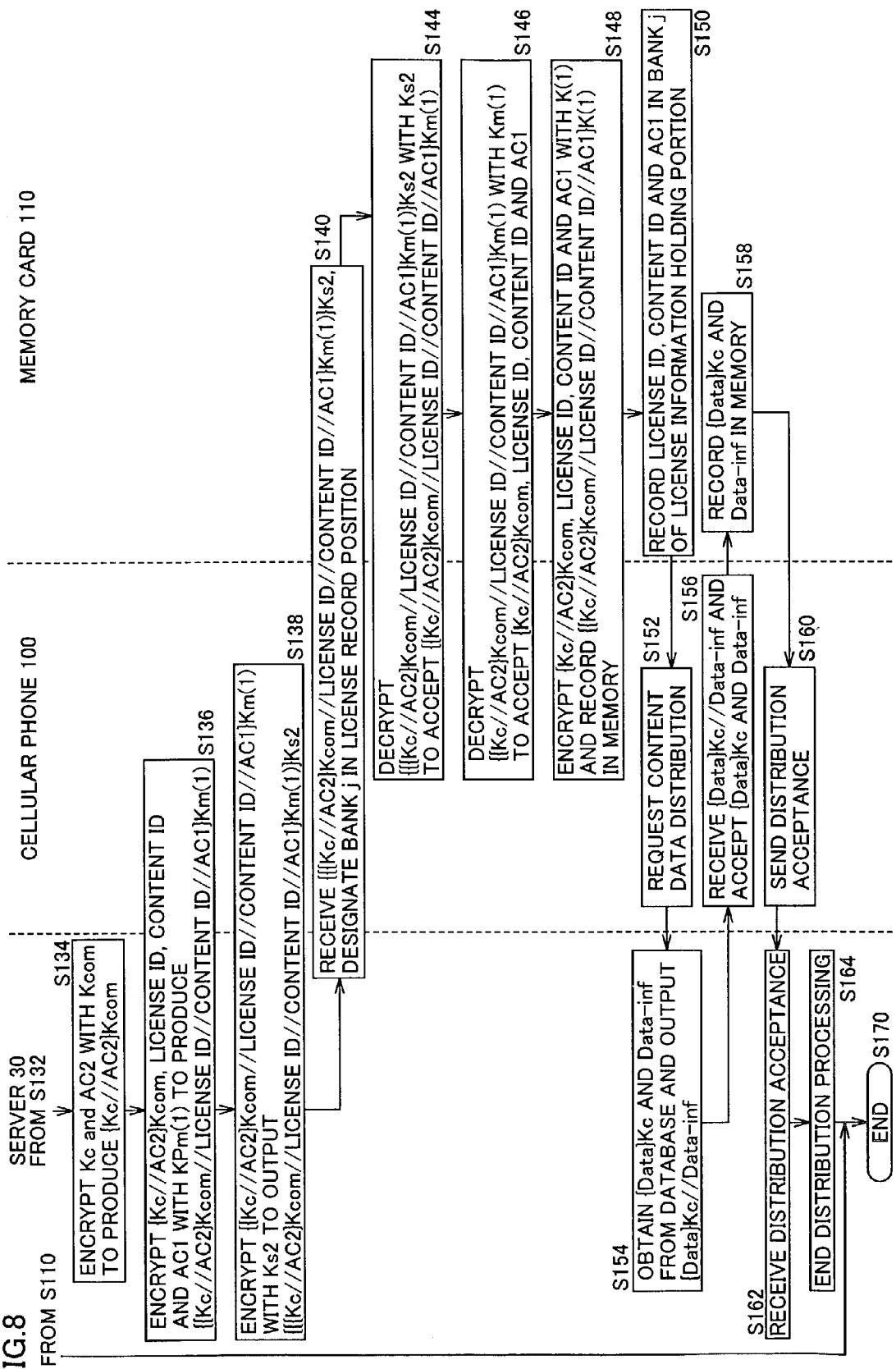
FIG. 8 is a second flowchart representing the distributing operation in the data distribution system according to the first embodiment.

FIGS. 7 and 8 are first and second flowcharts representing a distributing operation, which will also be referred to as a "distribution session" hereinafter), and is performed when purchasing the contents in the data distribution system according to the first embodiment.

FIGS. 7 and 8 represent an operation performed when user 1 using memory card 110 receives the content data distributed from distribution server 30 via cellular phone 100.

First, user 1 requests the distribution cellular phone 100 of user 1, e.g., by operating keys or buttons on touch key unit 1108 (step S100).

In memory card 110, authentication data holding portion 1400 outputs authentication data {KPmc(1)}KPma in response to this request (step S102).

Cellular phone 100 sends authentication data {KPmc(1)}KPma accepted from memory card 110 as well as authentication data {KPp(1)}KPma of cellular phone 100 itself, the content ID for designating the content data to be distributed and data AC of the license purchase conditions to distribution server 30 (step S104).

Distribution server 30 receives the content ID, authentication data {KPmc(1)}KPma and {KPp(1)}KPma, and license purchase condition data AC (step S106), and performs the decryption with authentication key KPma by decryption processing portion 312. If public encryption keys KPmc(1) and KPp(1) encrypted with authentication key KPma are registered regularly, and are encrypted regularly, public encryption key KPmc(1) of memory card 110 and public encryption key KPp(1) of cellular phone 100 are accepted. If these are not registered regularly, such unregistered public encryption keys KPmc(1) and KPp(1) are not accepted (step S108).

Distribution control portion 315 makes an inquiry to authentication server 12 based on accepted public encryption keys KPmc(1) and KPp(1) (step S110). If these public encryption keys were accepted in step S108, and were regularly registered, these keys are determined as valid keys, and the processing moves to a next step (step S112). If the public encryption keys were not accepted, or if the public encryption keys were accepted but were not registered, these keys are determined as invalid keys, and the processing ends (step S170).

For authenticating public encryption key KPp(1) or KPmc(1) in the decryption processing performed with authentication key KPma, such a structure may be employed that distribution control portion 315 in license server 10 performs the authentication in its own manner in accordance with results obtained by decrypting a signature, which is added to public encryption key KPp(1) or KPmc(1), with authentication key KPma.

When it is determined from the inquiry that the keys are valid, distribution control portion 315 produces the transaction ID for specifying the distribution session (step S112).

Then, session key generating portion 316 produces session key Ks1 for distribution. Session key Ks1 is encrypted by encryption processing portion 318 with public encryption key KPmc(1) corresponding to memory card 110 and obtained by decryption processing portion 312 (step S114).

The transaction ID and encrypted session key {Ks1}Kmc(1) are externally output via data bus BS1 and communication device 350 (step S116).

When cellular phone 100 receives the transaction ID and encrypted session key {Ks 1}Kmc(1) (step S118), memory card 110 operates to decrypt the received data applied onto data bus BS3 by decryption processing portion 1404 with private decryption key Kmc(1), which is held in holding portion 1402 and is unique to memory card 110, and thereby to extract decrypted session key Ks1 (step S120).

When controller 1420 confirms the acceptance of session key Ks1 produced by distribution server 30, it instructs session key generating portion 1418 to produce session key Ks2, which is to be produced during the distribution session in memory card 110.

Encryption processing portion 1406 encrypts session key Ks2 and public encryption key KPm(1), which are applied via a contact Pc of select switch 144 by switching a contact of a select switch 1446, with session key Ks1 applied via contact Pa of select switch 1442 from decryption processing portion 1404, and outputs data {Ks2//KPm(1)}Ks1 onto data bus BS3 (step S122).

Data {Ks2//KPm(1)}Ks1 output onto data bus BS3 is sent from data bus BS3 to cellular phone 100 via terminal 1202 and memory interface 1200 (step S122), and is sent from cellular phone 100 to distribution server 30 (step S124).

Distribution server 30 receives encrypted data {Ks2//KPm(1)}Ks1, and decrypts it with session key Ks1 by decryption processing portion 320 to accept session key Ks2 produced in memory card 110 and public encryption key KPm(1) unique to memory card 110 (step S126).

Further, distribution control portion 315 produces the license ID, access restriction information AC1 and reproducing circuit restriction information AC2 in accordance with the content ID and license purchase condition data AC obtained in step S106 (step S130). Further, license key Kc for decrypting the encrypted content data is obtained from information database 304 (step S132).

Referring to FIG. 8, distribution control portion 315 applies license key Kc and reproducing circuit restriction information AC2 thus obtained to encryption processing portion 324. Encryption processing portion 324 uses secret common key Kcom, which is obtained from Kcom holding portion 322 and is symmetric to the reproduction circuit, as an encryption key, and encrypts license key Kc and reproducing circuit restriction information AC2 (step S134).

Encrypted data {Kc//AC2}Kcom output from encryption processing portion 324 as well as the license ID, content ID and access restriction information AC1 output from distribution control portion 315 are encrypted by encryption processing portion 326 with public encryption key KPm(1), which is obtained by decryption processing portion 320 and is unique to memory card 110 (step S136).

Encryption processing portion 328 receives the output of encryption processing portion 326, and encrypts it with session key Ks2 produced in memory card 110. Encrypted data {{{Kc//AC2}Kcom//license ID//content ID//AC1}Km(1)}Ks2 output from encryption processing portion 328 is sent to cellular phone 100 via data bus BS1 and communication device 350 (step S138).

As described above, distribution server 30 and memory card 110 exchange the session keys produced thereby, and each execute the encryption with the received encryption key for sending the encrypted data to the other party. Thereby, mutual authentication can also be actually or practically performed when sending and receiving the encrypted data, and thereby the security level in the data distribution system can be improved.

Cellular phone 100 receives encrypted data [[[Kc//AC2]Kcom//license ID//content ID//AC1]Km(1)]Ks2 sent thereto (step S140), and memory card 110 operates to decrypt the received data applied via memory interface 1200 onto data bus BS3 by decryption processing portion 1412. Thus, decryption processing portion 1412 decrypts the data received from data bus BS3 with session key Ks2 applied from session key generating portion 1418, and outputs the decrypted key onto data bus BS4 (step S144).

In this stage, data bus BS4 is supplied with data {{Kc//AC2}Kcom//license ID//content ID//AC1}Km(1), which can be decrypted with private decryption key Km(1) held in Km(1) holding portion 1421. In accordance with the instruction of controller 1420, decryption processing portion 1422 decrypts data {{Kc//AC2}Kcom//license ID//content ID//AC1}Km(1) with private decryption key Km(1) so that data {Kc//AC2}Kcom, license ID, content ID and access restriction information AC1 are accepted (step S146).

Data {Kc//AC2}Kcom, license ID, content ID and access restriction information AC1 thus accepted are encrypted again by encryption processing portion 1452 with secret symmetric key K(1) unique to memory card 110, and {{Kc//AC2}Kcom//license ID//content ID//AC1}K(1) is recorded in memory 1415 outside the TRM region (step S148).

The license information (license ID, content ID and access restriction information AC1), which is a part of reproduction information, is recorded in an empty bank j located in a jth position within license information holding portion 1440. Natural number j corresponds to the content data, and satisfies a relationship of $(1 \leq j \leq N)$ (N: total number of banks).

When the processing in and before step S150 is normally completed, cellular phone 100 sends a distribution request for the content data to distribution server 30 (step S152).

When distribution server 30 receives the distribution request for the content data, it obtains encrypted content data {Data}Kc and additional data Data-inf from information database 304, and outputs the data thus obtained via data bus BS1 and communication device 350 (step S154).

Cellular phone 100 receives {Data}Kc//Data-inf, and accepts encrypted content data {Data}Kc and additional information Data-inf (step S156). Encrypted content data {Data}Kc and additional information Data-inf are transmitted onto data bus BS3 of memory card 110 via memory interface 1200 and terminal 1202. In memory card 110, encrypted content data {Data}Kc and additional information Data-inf thus received are recorded in memory 1415 as they are (step S158).

Cellular phone 100 sends a notification of distribution acceptance to distribution server 30 (step S160). When distribution server 30 receives the distribution acceptance (step S162), storage of accounting data in accounting database 302 and other processing for ending the distribution are executed (step S164) so that the whole processing ends (step S170).

In the distribution processing, data {Kc//AC2}Kcom, license ID, content ID and access restriction information AC1 are obtained by decryption with private decryption key Km(1) in step S146, and then are encrypted with private key K(1) again for storing them in memory 1415. This is for the following reasons.

In a public key scheme using asymmetric keys, and particularly when using a combination of public encryption key KPm(1) and private decryption key Km(1), decryption processing may take a long time.

Therefore, the data is encrypted again with secret symmetric key K(1), which is used in a symmetric key cryptosystem, is unique to the memory card and is in the symmetric key cryptosystem allowing fast decryption. This allows fast decryption processing of license key Kc and reproducing circuit restriction information AC2, which are information required for the reproduction processing, in the reproduction processing of the content data corresponding to the encrypted content data.

Further, the key for the data sending is different from the key for the data storage in the memory card so that the security level is improved.

The public key cryptosystem described above may be specifically a RAS cryptosystem (Rivest-Shamir-Adleman cryptosystem), elliptic curve cryptosystem or the like, and the symmetric key cryptosystem may be specifically a DES (Data Encryption Standard) cryptosystem or the like.

Description has been given on the structure, in which the reproduction information obtained by decrypting the data encrypted based on asymmetric key KPm(1)/Km(1) in the public key cryptosystem is entirely encrypted again with secret symmetric key K(1), which is a symmetric key in the symmetric key cryptosystem. However, another structure may be employed. For example, such a structure may be employed that data license ID, content ID and access restriction information AC1, which are held in license information holding portion 1440 provided within the TRM region of memory card 110, are neither re-encrypted nor stored in memory 1415, and data {Kc//AC2}Kcom are recorded in memory 1415 after being reencrypted with secret symmetric key K(1).

Further, the content data can be distributed only after confirming the validities of public encryption keys Kp(1) and Kmc(1), which are sent from the content recording portion of cellular phone 100 and memory card 110 in response to the distribution request, respectively. Therefore, distribution to unauthorized devices can be inhibited, which improves the security level in the distribution.

[Reproducing Operation]

Description will now be given on the reproducing operation (which will be referred to as the "reproduction session" hereinafter), in which music is reproduced from the encrypted content data held in memory card 110, and is externally output.

Figure 9:
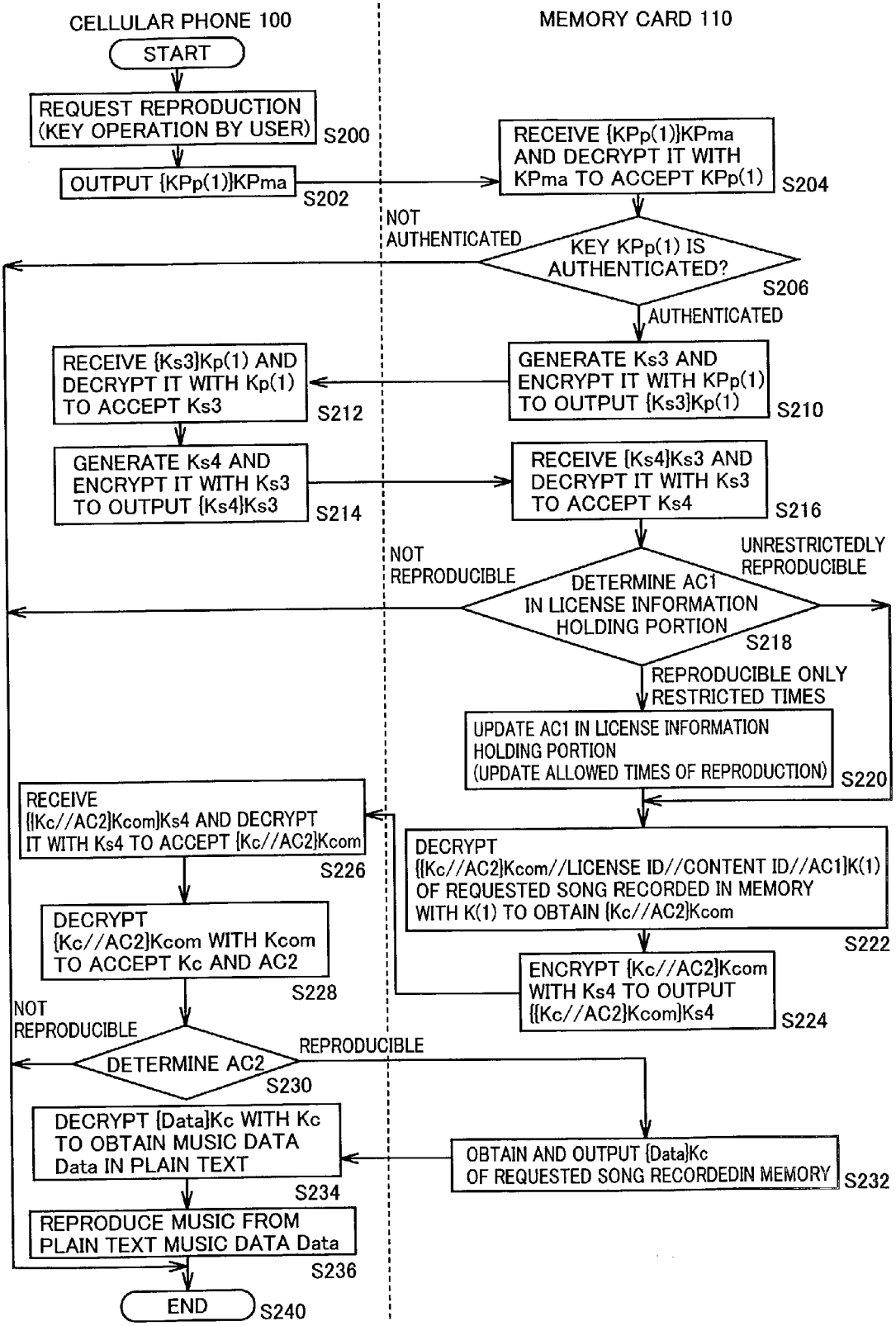
FIG. 9 is a flowchart representing a reproducing operation for reproducing music in cellular phone 100 according to the first embodiment.

FIG. 9 is a flowchart representing various operations in the reproduction session.

Referring to FIG. 9, user 1 applies an instruction to produce the reproduction request via touch key unit 1108 or the like of cellular phone 100 (step S200).

In response to the production of reproduction request, cellular phone 100 operates to output authentication data {KPp(1)}KPma, which can be decrypted with authentication key KPma, from authentication data holding portion 1500 onto data bus BS2 (step S202).

Authentication data {KPp(1)}KPma for the authentication is transmitted to memory card 110 via data bus BS2 and memory interface 1200.

In memory card 110, decryption processing portion 1408 takes in authentication data {KPp(1)}KPma, which is transmitted for authentication onto data bus BS3 via terminal 1202. Decryption processing portion 1408 receives authentication key KPma from a KPma holding portion 1414, and decrypts the data sent from data bus BS3. If public encryption key KPp(1) encrypted with authentication key KPma is regularly registered and is regularly encrypted, and thus if decryption can be performed with authentication key KPma, and the belonging data generated by the decryption can be authenticated, the decrypted public encryption key KPp(1) is accepted. If not, or if the belonging data generated by the decryption cannot be authenticated, the obtained data is not accepted (step S204).

When decryption processing portion 1408 accepts the public encryption key KPp(1), which is unique to the content reproducing circuit in cellular phone 100, controller 1420 determines that the public encryption key KPp(1) sent thereto is the public encryption key assigned to the content reproducing circuit authenticated in this data distribution system, and the processing moves to a next step S210 (step S206). If not accepted, it is determined that invalid access is made by an unauthorized device, and the processing ends (step S240).

When public encryption key KPp(1) is accepted, controller 1420 instructs session key generating portion 1418 via data bus BS4 to produce session key Ks3 in the reproduction session. Session key Ks3 produced by session key generating portion 1418 is sent to encryption processing portion 1410. Encryption processing portion 1410 encrypts session key Ks3 with public encryption key KPp(1) of cellular phone 100 obtained by decryption processing portion 1408, and outputs encrypted data {Ks3}Kp(1) onto data bus BS3 (step S210).

Cellular phone 100 receives encrypted data {Ks3}Kp(1) applied onto data bus BS via terminal 102 and interface 1200. Encrypted data {Ks3}Kp(1) is decrypted by decryption processing portion 1504, and session key Ks3 produced by memory card 110 is accepted (step S212).

In response to the acceptance of session key Ks3, controller 1106 instructs session key generating portion 1508 via data bus BS2 to generate session key Ks4 produced by cellular phone 100 in the reproduction session. Session key Ks4 thus produced is sent to encryption processing portion 1506, and is encrypted with session key Ks3 obtained by decryption processing portion 1504 to produce encrypted key {Ks4}Ks3, which is output onto data bus BS2 (step S214).

Encrypted session key {Ks4}Ks3 is transmitted to memory card 110 via memory interface 1200. In memory card 110, decryption processing portion 1412 decrypts encrypted session key {Ks4}Ks3 transmitted onto data bus BS3, and session key Ks4 produced in cellular phone 100 is accepted (step S216).

In response to acceptance of session key Ks4, controller 1420 determines access restriction information AC1 in license holding portion 1440 bearing the corresponding content ID (step S218).

In step S218, access restriction information AC1 relating to restrictions on the memory access is determined. If the reproduction is already impossible, the reproduction session ends (step S240). If the reproduction is possible but the allowed times of reproduction are restricted, the operation moves to a next step S222 after updating the data of access restriction information AC1 to update the allowed times of reproduction (step S220). If access restriction information AC1 does not restrict the reproduction times, step S220 is skipped, and the processing moves to next step S222 without updating access restriction information AC1.

When the content ID corresponding to the requested song is not present in license information holding portion 1440, it is likewise determined that the reproduction is impossible, and the reproduction session ends (step S240). When it is determined in step S218 that the reproduction is allowed in the current reproduction session, decryption processing is performed for obtaining license key Kc of the reproduction-requested song recorded in the memory as well as reproducing circuit restriction information AC2. More specifically, decryption processing portion 1454 operates in response to the instruction of controller 1420 to decrypt encrypted data {{Kc//AC2}Kcom//license ID//content ID//AC1}K(1), which is read from memory 1415 onto data bus BS4, with secret symmetric key K(1) unique to memory card 110. Thereby, encrypted data {Kc//AC2}Kcom decodable with secret common key Kcom is obtained (step S222).

Encrypted data {Kc//AC2}Kcom thus obtained is sent to encryption processing portion 1406 via a contact Pd of select switch 1444. Encryption processing portion 1406 further encrypts encrypted data {Kc//AC2}Kcom received from data bus BS4 with session key Ks4, which is received from decryption processing portion 1412 via contact Pb of select switch 1442, and outputs {{Kc//AC2}Kcom}Ks4 onto data bus BS3 (step S224).

The encrypted data output onto data bus BS3 is sent to cellular phone 100 via memory interface 1200.

In cellular phone 100, decryption processing portion 1510 decrypts encrypted data {{Kc//AC2}Kcom}Ks4 transmitted onto data bus BS2 via memory interface 1200, and accepts data {Kc//AC2}Kcom, i.e., encrypted license key Kc and reproduction circuit restriction information AC2 (step S226). Decryption processing portion 1514 decrypts encrypted data {Kc//AC2}Kcom with secret common key Kcom, which is received from Kcom holding portion 1512 and is common to all the content reproducing circuit, and accepts license key Kc and reproducing circuit restriction information AC2 (step S228). Decryption processing portion 1514 transmits license key Kc to decryption processing portion 1516, and outputs reproducing circuit restriction information AC2 onto data bus BS2.

Controller 1106 accepts reproducing circuit restriction information AC2 via data bus BS2, and determines the reproducibility (step S230).

When it is determined from reproducing circuit restriction information AC2 in step S230 that the reproduction is impossible, the reproduction session ends (step S240).

If the reproduction is possible, encrypted content data {Data}Kc of the requested song recorded in the memory of memory card 110 is output onto data bus BS3, and is transmitted to cellular phone 100 via memory interface 1200 (step S232).

In cellular phone 100, decryption processing portion 1516 decrypts encrypted content data {Data}Kc, which is output from memory card 110 and is transmitted onto data bus BS2, with license key Kc so that content data Data in plain text can be obtained (step S234). From decrypted content data Data in plain text, music reproducing portion 1518 reproduces music, and the reproduced music is externally output via switching portion 1525 and terminal 1530 so that the processing ends (step S240).

The above structures can reduce the time required for the decryption processing, which is performed for reading license key Kc and reproducing circuit restriction information AC2 required for reproduction from memory card 110 in the reproduction session. Therefore, the structures can quickly start reproduction of the music in response to the reproduction request of the user.

In the reproduction session, cellular phone 100 and memory card 110 exchange the encryption keys produced thereby, and each execute the encryption with the received encryption key to send the encrypted data to the other. As a result, the mutual authentication can be performed in each of operations of sending and receiving data in the reproduction session, similarly to the distribution session, and the security level in the data distribution system can be improved.

[Transferring Operation]

Description will now be given on the processing for transferring the content data between the two memory cards.

Figure 10:
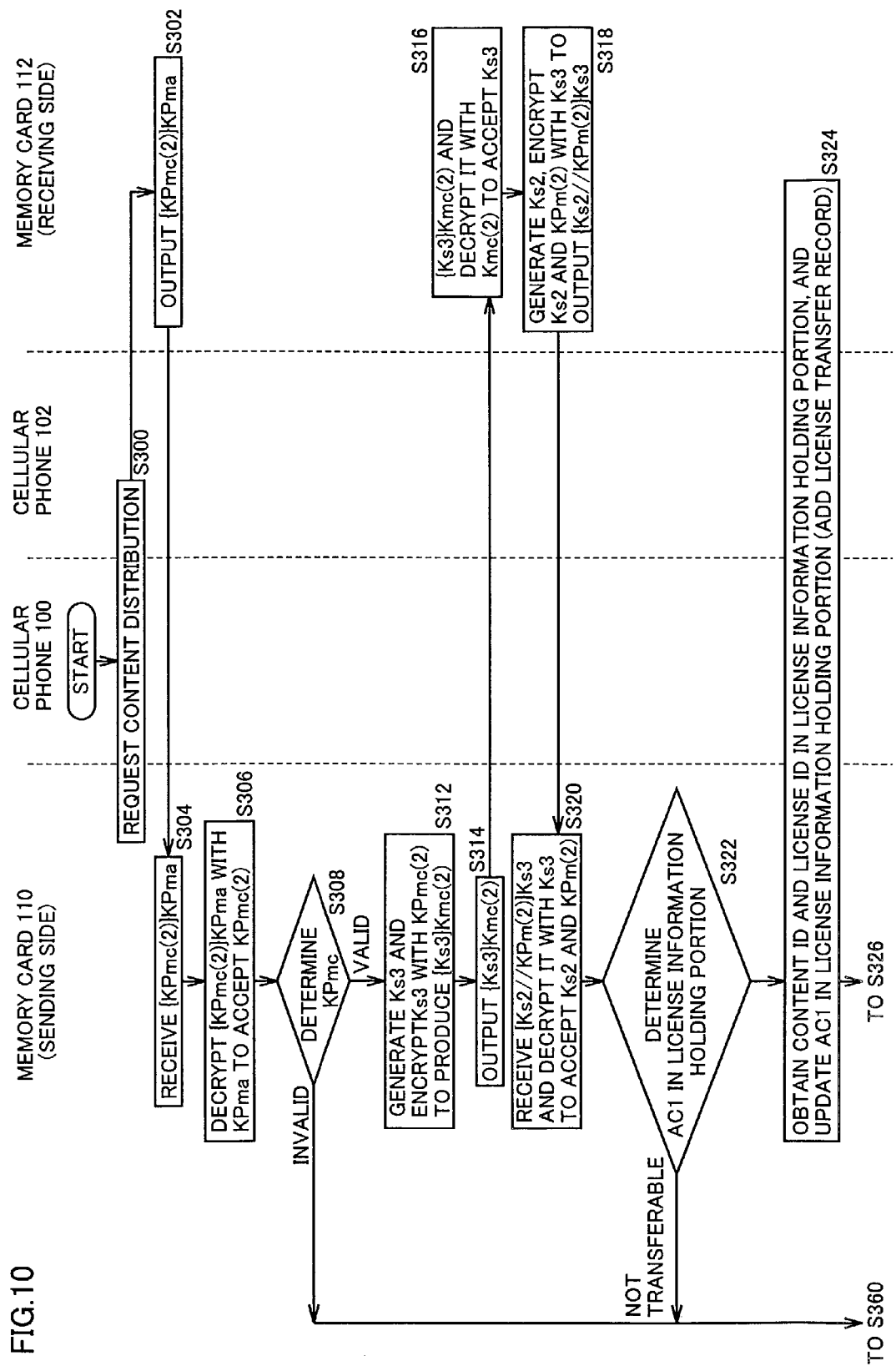
FIG. 10 is a first flowchart representing an operation of transfer between two memory cards according to the first embodiment.
Figure 11:
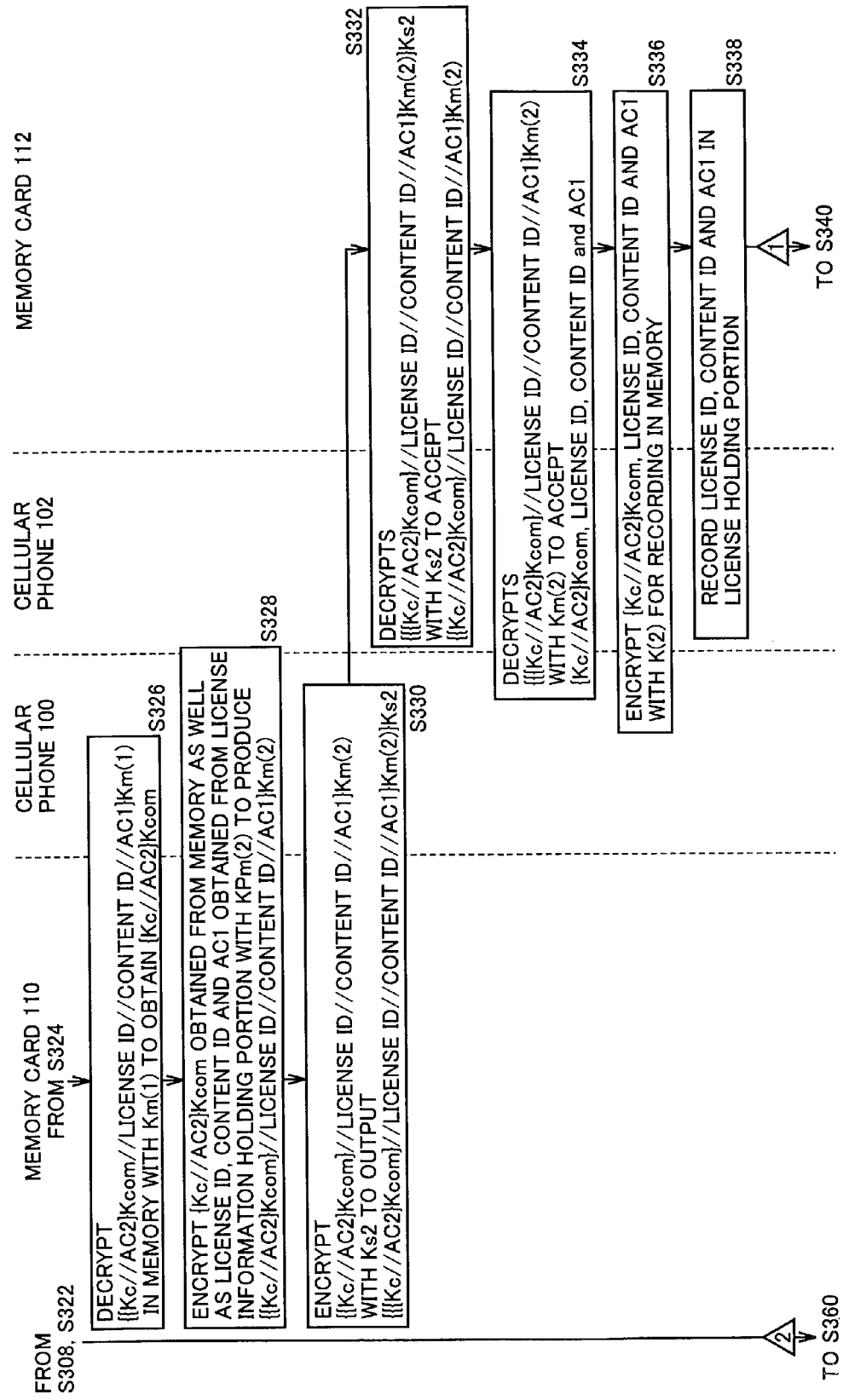
FIG. 11 is a second flowchart representing the operation of transfer between two memory cards according to the first embodiment.
Figure 12:
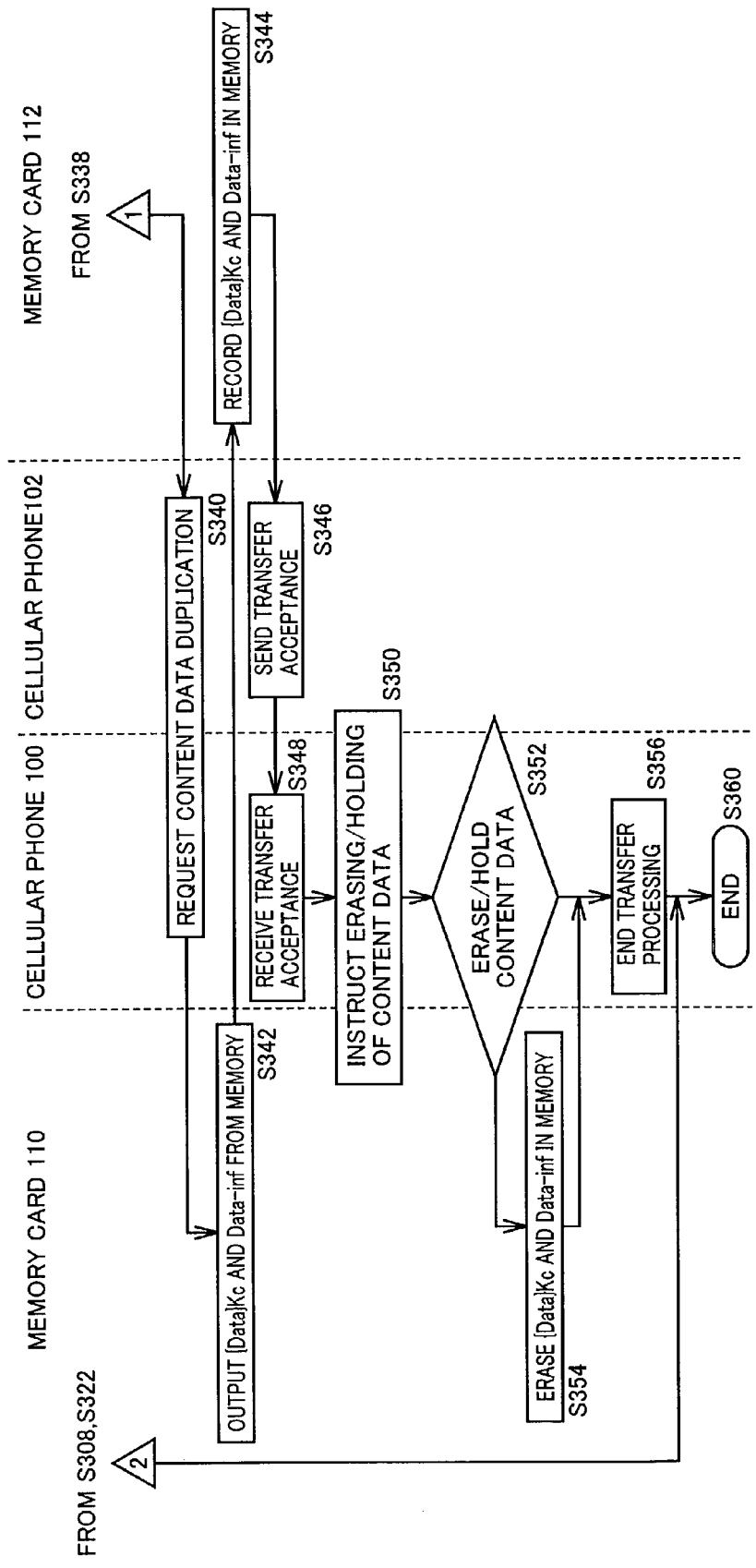
FIG. 12 is a third flowchart representing the operation of transfer between two memory cards according to the first embodiment.

FIGS. 10, 11 and 12 are first and second flowcharts representing the transference of the content data, keys and others between two memory cards 110 and 112 via cellular phones 100 and 102.

In FIGS. 10–12, the natural numbers n, which represent the kinds of cellular phone 100 and memory card 102, respectively, are both equal to one (n=1). Also, the natural numbers n, which represent the kinds of cellular phone 102 and memory card 112, respectively, are both equal to two (n=2). Natural numbers i used for identifying memory cards 110 and 112 are equal to one and two (i=1 and i=2), respectively.

In FIGS. 10–12, cellular phone 100 and memory card 110 are on the sending side, and cellular phone 102 and memory card 112 are on the receiving side. Memory card 112 has substantially the same structure as memory card 110, and is attached to cellular phone 102. In the following description, respective components and portions of memory card 112 bear the same reference numbers as those of memory card 110.

Referring to FIG. 10, user 1 on the sending side applies a content transfer request via cellular phone 100 of user 1, e.g., by operating keys or buttons on touch key unit 1108 (step S300).

The transfer request thus produced is transmitted to memory card 112 of user 2 on the receiving side via cellular phone 120. In memory card 112, authentication data holding portion 1500 outputs authentication data {KPmc(2)}KPma including public encryption key KPmc(2) corresponding to memory card 112 (step S302).

Authentication data {KPmc(2)}KPma of memory card 112 is sent from cellular phone 102 of user 2 to cellular phone 100 of user 1, and is received by memory card 110 (step S304).

In memory card 110, If public encryption key KPmc(2) encrypted with authentication key KPma is regularly registered and is regularly encrypted, i.e., when the data can be decrypted with authentication key KPma, and the belonging data produced by the decryption can be authenticated, decrypted public encryption key KPmc(2) is accepted as the public encryption key of memory card 112. If the decryption is impossible, or when the belonging data produced by the decryption cannot be authenticated, the obtained data is not accepted (step S306).

When decryption processing portion 1408 accepts public encryption key KPmc(2) unique to the contents of memory card 112, controller 1420 determines that public encryption key KPmc(2) sent thereto is the public encryption key assigned to the memory card authenticated in this data distribution system, and the processing moves to a next step S312 (step S308). If not accepted, controller 1420 determines that invalid access is made by an unauthorized device, and ends the processing (step S360).

When the authentication result is valid, controller 1420 instructs session key generating portion 1418 to output session key Ks3 generated on the sending side in the transfer session. Session key Ks3 produced by session key generating portion 1418 is transmitted to encryption processing portion 1410. Encryption processing portion 1410 further receives public encryption key KPmc(2) of memory card 112, which is decrypted by decryption processing portion 1408 in step S306, and encrypts session key Ks3 with public encryption key KPmc(2). Thereby, encrypted session key {Ks3}Kmc(2) is output onto data bus BS3 (step S314).

Encrypted session key {Ks3}Kmc(2) is transmitted to memory card 112 via memory interface 1200, cellular phone 100 and cellular phone 102.

Memory card 112 receives encrypted key {Ks3}Kmc(2) sent from memory card 110, and decrypts it by decryption processing portion 1404 with private decryption key Kmc(2) corresponding to memory card 112 to accept session key Ks3 produced by memory card 110 on the sending side (step S316).

In response to acceptance of session key Ks3, controller 1420 of memory card 112 instructs session key generating portion 1418 to produce session key Ks2, which is to be generated on the receiving side in the transfer session. Session key Ks2 produced thereby is transmitted to encryption processing portion 1406 via a contact Pf in select switch 1446 and a contact Pc in select switch 1444.

Decryption processing portion 1406 receives session key Ks3 obtained by decryption processing portion 1404 in step S316, and encrypts session key Ks2 and public encryption key KPm(2), which are obtained via contact Pc in select switch 1444 by appropriately selecting contacts Pf and Pe in select switch 1446, with session key Ks1, and outputs {Ks2//KPm(2)}Ks3 onto data bus BS3 (step S318).

Encrypted data {Ks2//KPm(2)}Ks3 output onto data bus BS3 is transmitted onto data bus BS3 of memory card 110 via cellular phones 102 and 100.

In memory card 110, decryption processing portion 1412 decrypts the encrypted data transmitted onto data bus BS3 with session key Ks3, and accepts session key Ks2 and public encryption key KPm(2) related to memory card 112 (step S320).

In accordance with the acceptance of session key Ks2 and public encryption key KPm(2), controller 1420 in memory card 110 determines the access restriction information AC1 in license information holding portion 1440 (step S322). When it is determined from access restriction information AC1 that transfer of license is impossible, the transfer is stopped at this stage (step S360).

When it is determined from access restriction information AC1 that the transfer session is allowed, the processing moves to next step S322, and controller 1420 obtains the corresponding content ID and license ID from license information holding portion 1440, updates the access restriction information in license information holding portion 1440, and records the inhibition of subsequent reproduction and transfer (step S324). In response to this, access restriction information AC1 is determined in each of the reproduction session and the transfer session, and processing is performed to inhibit the subsequent reproduction session and the subsequent transfer session.

Controller 1420 instructs the output of reproduction information corresponding to the content to be transferred. Decryption processing portion 1454 decrypts encrypted data {{Ks2//AC2}Kcom//license ID//content ID//AC1}K(1) output from memory 1415 so that {Kc//Ac2}Kcom is obtained on data bus BS4 (step S326).

The license ID, content ID and access restriction information AC1, which are obtained from license information holding portion 1440 in step S324, and {Kc//Ac2}Kcom obtained in step S326 are taken into encryption processing portion 1424 via data bus BS4, and is encrypted. Encryption processing portion 1424 encrypts these received data with public encryption key KPm(2), which is obtained by decryption processing portion 1412 in step S320, and is unique to memory card 112, to produce {{Ks2//AC2}Kcom//license ID//content ID//AC1}Km(2) (step S328).

Encrypted data {{Ks2//AC2}Kcom//license ID//content ID//AC1}Km(2), which is output onto data bus BS4, is transmitted to encryption processing portion 1406 via contact Pd of select switch 1444. Encryption processing portion 1406 receives session key Ks2, which was prepared by memory card 112 and is obtained by decryption processing portion 1412, via contact Pb of select switch 1442, and encrypts the data received from contact Pd with session key Ks2.

Encryption processing portion 1406 outputs data {{{Ks2//AC2}Kcom//license ID//content ID//AC1}Km(2)}Ks2 onto data bus BS3 (step S330). In step S330, the encrypted data output onto data bus BS3 is transmitted to memory card 112, which is a receiver in the transfer session, via cellular phones 100 and 102.

In memory card 112, decryption processing portion 1412 performs the decryption with session key Ks2 produced by session key generating portion 1418, and accepts {{Ks2//AC2}Kcom//license ID//content ID//AC1}Km(2) (step S332).

Data {{Ks2//AC2}Kcom//license ID//content ID//AC1}Km(2) encrypted with public encryption key KPm(2) is decrypted by decryption processing portion 1422 with private decryption key Km(2) unique to memory card 112 so that {Ks2//AC2}Kcom, license ID, content ID and access restriction information AC1 are accepted (step S334).

Then, data {Ks2//AC2}Kcom, license ID, content ID and access restriction information AC1 thus accepted are encrypted again by encryption processing portion 1452 with secret symmetric key K(2), which is held in K(2) holding portion 1450 and is unique to the memory card, and encrypted data {{Ks2//AC2}Kcom//license ID//content ID//AC1}K(2) is recorded in memory 1415 outside the TRM region (step S336).

Further, the license ID, content ID and access restriction information AC1 accepted by decryption processing portion 1422 are recorded in the designated bank of license information holding portion 1440 (step S338).

When the processing in and before steps 338 are normally completed in the foregoing manner, a request for duplication of the content data is further issued via cellular phone 102 in response to the transfer of the reproduction information including license key Kc (step S340).

The request for duplication of the content data is transmitted to memory card 110 via cellular phone 100. In response to this, corresponding encrypted content data {Data}Kc and additional information Data-inf are output from memory 1415 in memory card 110 onto data bus BS3 (step S342). These data output onto data bus BS3 are transmitted to memory card 112 via memory interface 1200, cellular phone 100 and cellular phone 102, and are recorded in memory 1415 in memory card 112 (step S344).

When recording of encrypted content data {Data}Kc and additional information Data-inf is completed, transfer acceptance is sent via cellular phone 102 (step S346).

When memory card 112 and corresponding cellular phone 102 normally execute the reproduction session in response to the above transfer acceptance, the user can listen to music via cellular phone 102 based on encrypted content data {Data}Kc and license key Kc recorded in memory card 112.

Cellular phone 100 on the sending side receives the transfer acceptance sent from cellular phone 102 (step S348), and receives an instruction from the user via touch key unit 1108 to either erase or hold the content data (step S350).

When erasing of the content data is instructed via touch key unit 1108, corresponding encrypted content data {Data}Kc and additional information Data-inf are erased in memory 1415 within memory card 110 (step S354). When holding of the content data is instructed, step S354 is skipped, and the transfer processing ends in this stage (step S356). In the transfer processing ending step S356, which is performed when the transfer session was normally performed, or when the transfer session is stopped as a result of authentication, checking of access restriction information AC1 or the like, processing in all the transfer session are skipped after step S308 or S322 (step S360).

The reproduction information such as corresponding content ID recorded in license information holding portion 1440 is in the same state as the erasing because access restriction information AC1 was updated in step S324 to inhibit the reproduction session and the transfer session. When the bank storing the reproduction information in this state receives new reproduction information distributed or transferred thereto for new content data, overwriting is allowed. Therefore, similar effects can be achieved by erasing all the data in this bank.

In the state where the encrypted content data is already recorded in memory 1415, the encrypted content data can be reproduced for listening to the music only by accessing distribution server 30 and receiving the distributed reproduction information. The processing of distributing only the reproduction information is not represented in the flowcharts. However, this processing is substantially the same as the processing in the distribution session shown in FIGS. 7 and 8 except for that the steps S152, S154, S156 and S158 relating to the sending and receiving of the encrypted content data are not performed, and therefore description thereof is not repeated.

Owing to the above structures, the transfer session is likewise performed such that the encrypted data is transferred only after the content reproducing circuit (cellular phone) and memory card on the receiving side are authenticated. Therefore, the security level of the system is further increased.

[Second Embodiment]

Figure 13:
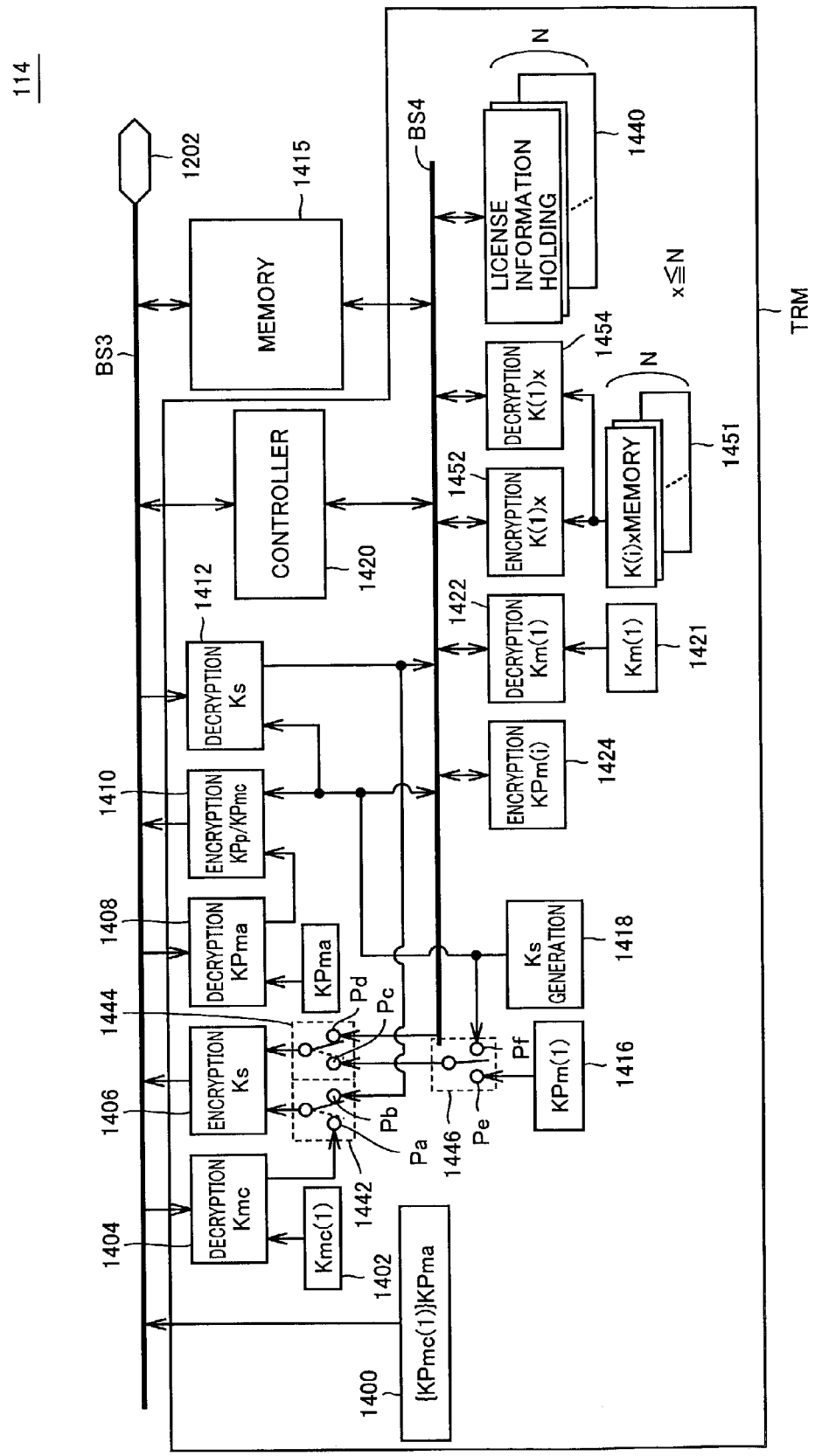
FIG. 13 is a block diagram showing a structure of a memory card 114 of a second embodiment.

FIG. 13 is a block diagram showing a structure of a memory card 114 of a second embodiment, and corresponds to FIG. 5 showing the first embodiment.

Referring to FIG. 13, memory card 114 differs from memory card 110 of the first embodiment shown in FIG. 5 in that a K(1)x holding portion 1451 employed in place of K(1) holding portion 1450 holds predetermined symmetric secret keys K(1)x ($1 \leq x \leq N$), which are N in number and are unique to the memory, for allowing correspondence to each bank in license information holding portion 1440. Therefore, encryption processing portion 1452 and decryption processing portion 1454 are configured to perform the encryption or decryption with secret symmetric keys K(1)x, which is different from those for other content data (i.e., reproduction information) to be processed, under the control of controller 1420.

Structures other than the above are substantially the same as those of memory card 110 of the first embodiment. The same portions bear the same reference numbers, and description thereof is not repeated.

Figure 14:
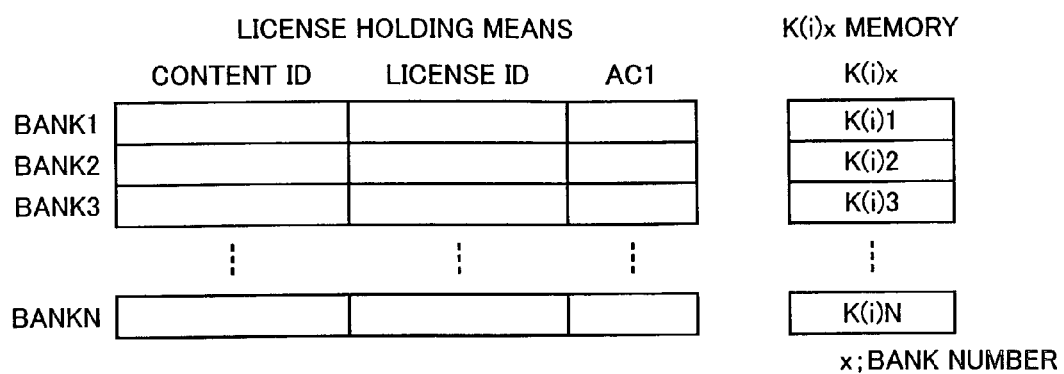
FIG. 14 conceptually shows allocation of storage regions in a license information holding portion 1440 and a K(1)x holding portion 1451 shown in FIG. 13.

FIG. 14 conceptually shows allocation of the storage regions in license information holding portion 1440 and K(1)x holding portion 1451 shown in FIG. 13.

Similarly to the first embodiment, license information holding portion 1440 can transmit to and from data bus BS4 the license ID data, content ID data and access restriction information AC1. License information holding portion 1440 has N (N: natural number) banks, each of which can store a portion of the reproduction information. Likewise, K(1)x holding portion 1415 has N banks, which correspond to the banks of license information holding portion 1440, and have already stored secret symmetric keys K(1)x ($1 \leq x \leq N$), respectively. In accordance with this, K(1)x holding portion 1451 has N (N: natural number) banks, and holds predetermined secret symmetric keys K(1)x ($1 \leq x \leq N$) corresponding to the respective licenses in the corresponding banks, respectively.

Figure 15:
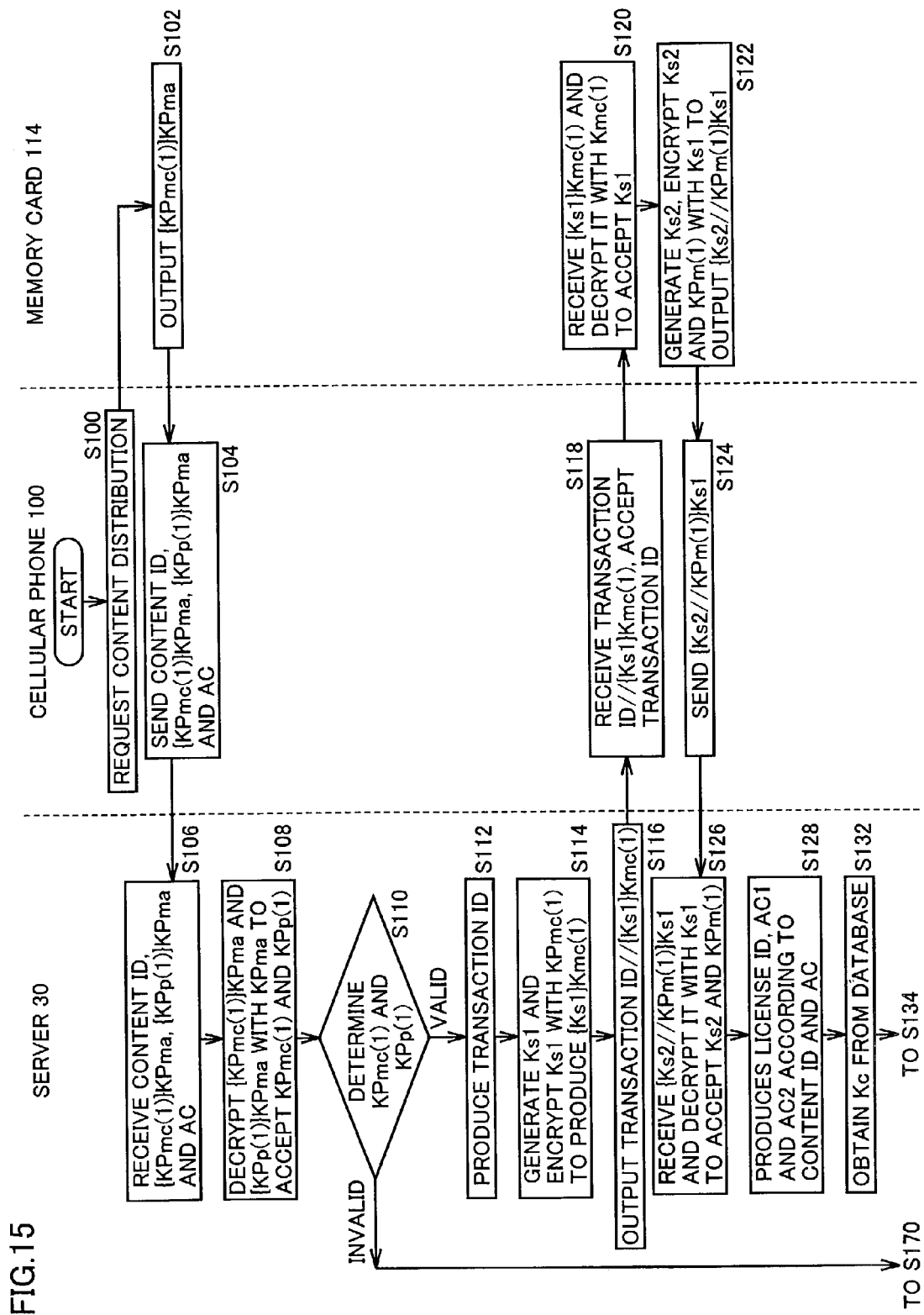
FIG. 15 is a first flowchart representing a distributing operation performed when purchasing contents in a data distribution system according to the second embodiment.
Figure 16:
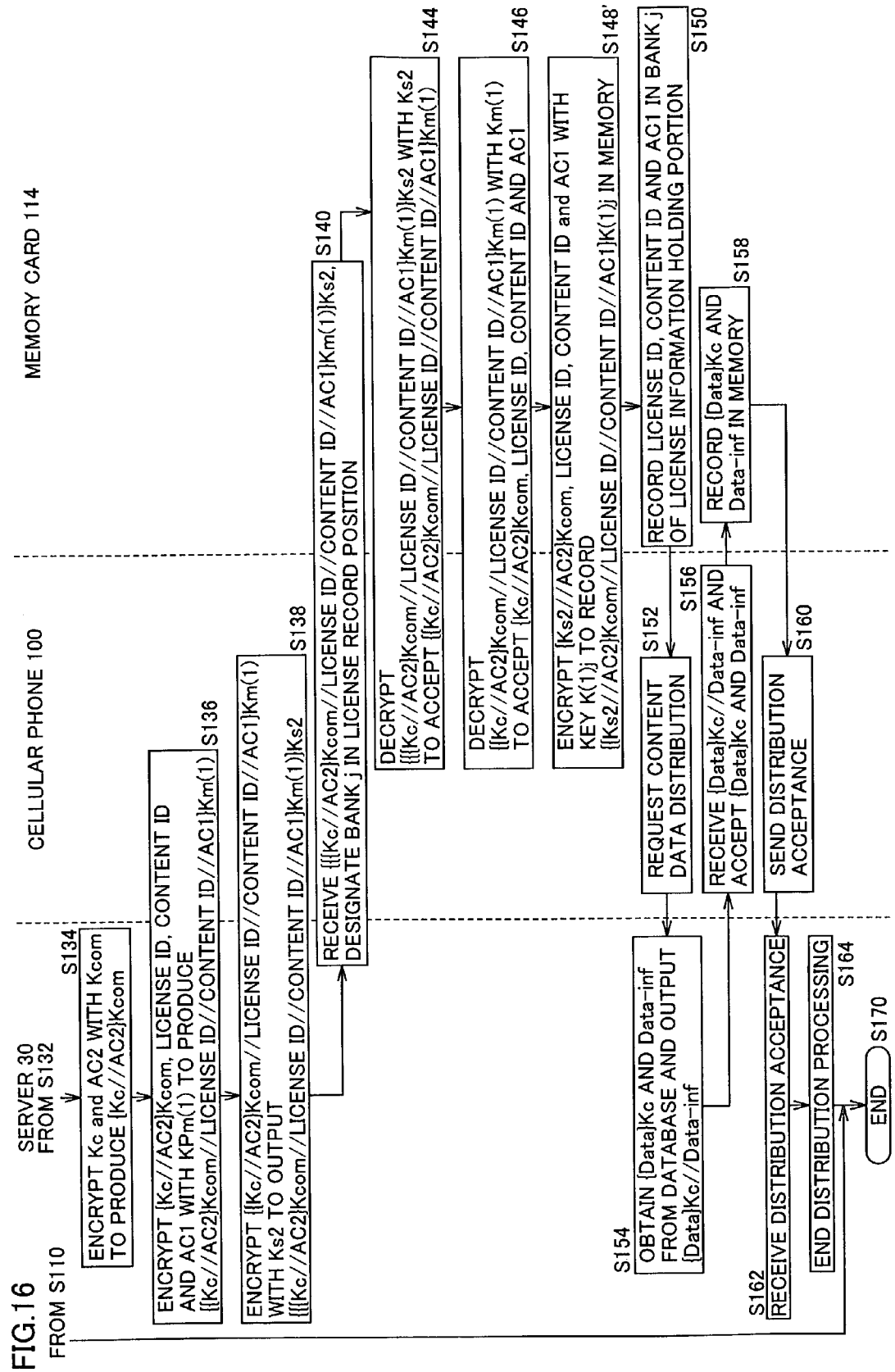
FIG. 16 is a second flowchart representing the distributing operation performed when purchasing contents in the data distribution system according to the second embodiment.

FIGS. 15 and 16 are first and second flowcharts representing the distributing operation, which is performed when purchasing the content in the data distribution system according to the second embodiment, and correspond to FIGS. 7 and 8 representing the first embodiment, respectively.

FIGS. 15 and 16 show operations, in which user 1 uses memory card 114 and receives the content data from distribution server 30 via cellular phone 100.

In contrast to the distribution processing using memory card 110 of the first embodiment, memory card 114 operates as follows. In step S148' shown in FIG. 16, data {Ks2// AC2}Kcom, license ID, content ID and access restriction information AC1 accepted in step S146 are encrypted by encryption processing portion 1452 with secret symmetric key K(1)x, which is unique to memory card 110 and corresponds to the bank of license information holding portion 1440. Thus, the reproduction information, which has the corresponding license ID and is recorded, e.g., in bank j ($1 \leq j \leq N$) of license information holding portion 1440, is encrypted with K(1)j and is recorded as encrypted reproduction information {{Ks2//AC2}Kcom//license ID//content ID//AC1}K(1)j in memory 1415 outside the TRM region.

Processing other than the above is substantially the same as that in the distributing operation of the first embodiment. The same steps and operations bear the same reference numbers, and description thereof is not repeated.

Figure 17:
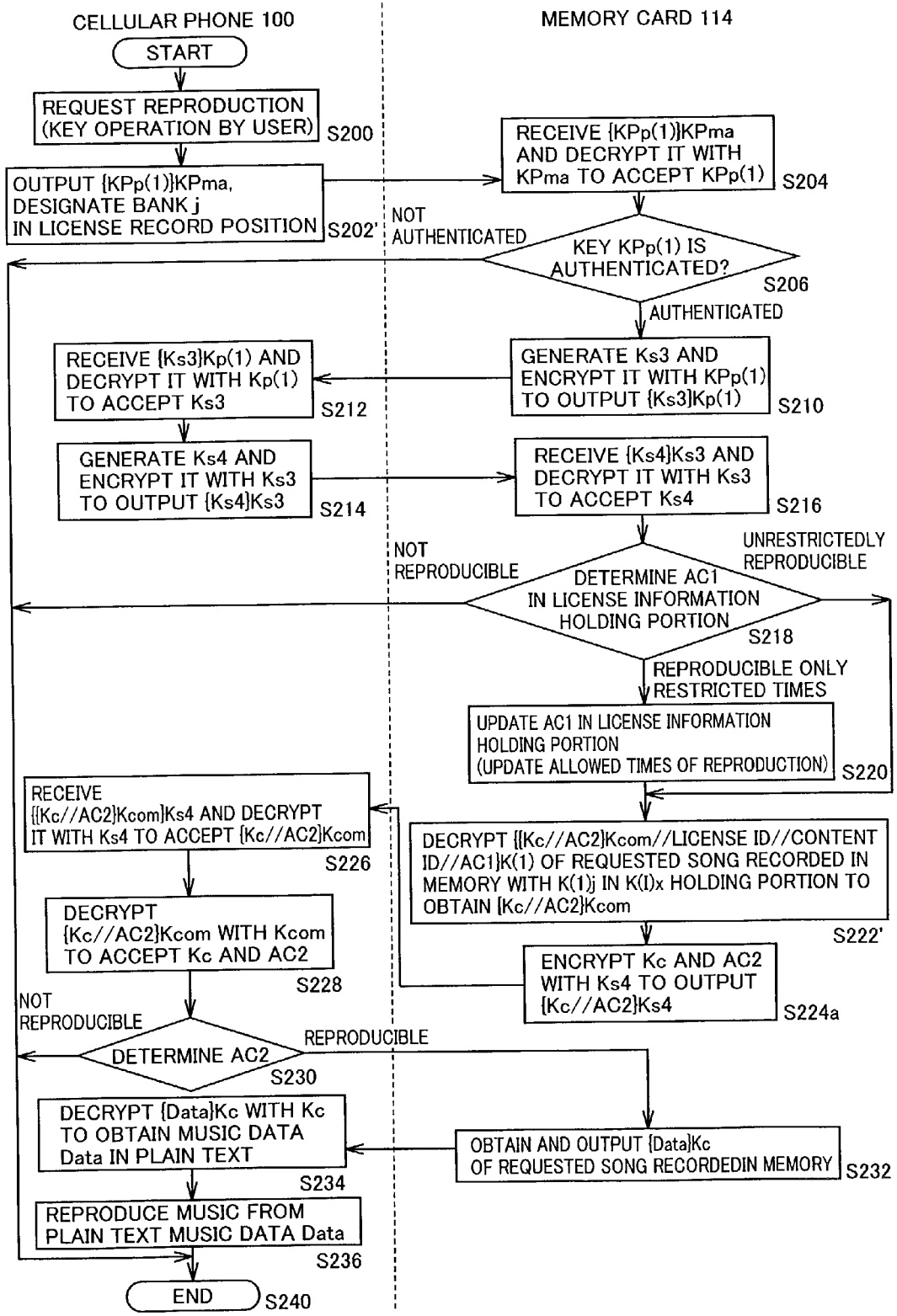
FIG. 17 is a flowchart representing the reproducing operation using the memory card in the second embodiment.

FIG. 17 is a flowchart representing operations of various portions in the reproduction session using the memory card of the second embodiment.

The processing in FIG. 17 differs from the distribution processing using memory card 110 of the first embodiment in the following points. In step S202' shown in FIG. 17, controller 1106 of cellular phone 100 sends an instrument relating to bank j in the position, where the license is recorded, to memory card 114. In step S222, encrypted data {{Ks2//AC2}Kcom//license ID//content ID//AC1}K(1)j read from memory 1415 onto data bus BS4 is decrypted by decryption processing portion 1454 with the secret symmetric key held in K(1)x holding portion 1451 and particularly with secret symmetric key K(1)j held in bank j under the control of controller 1420.

Processing other than the above are substantially the same as that in the reproducing operation of the first embodiment. The same steps and operations bear the same reference numbers, and description thereof is not repeated. The transfer operation of the memory card of the second embodiment is basically the same as that of the first embodiment.

Owing to the above structure, the security level for the content data can be further increased.

[Third Embodiment]

Figure 18:
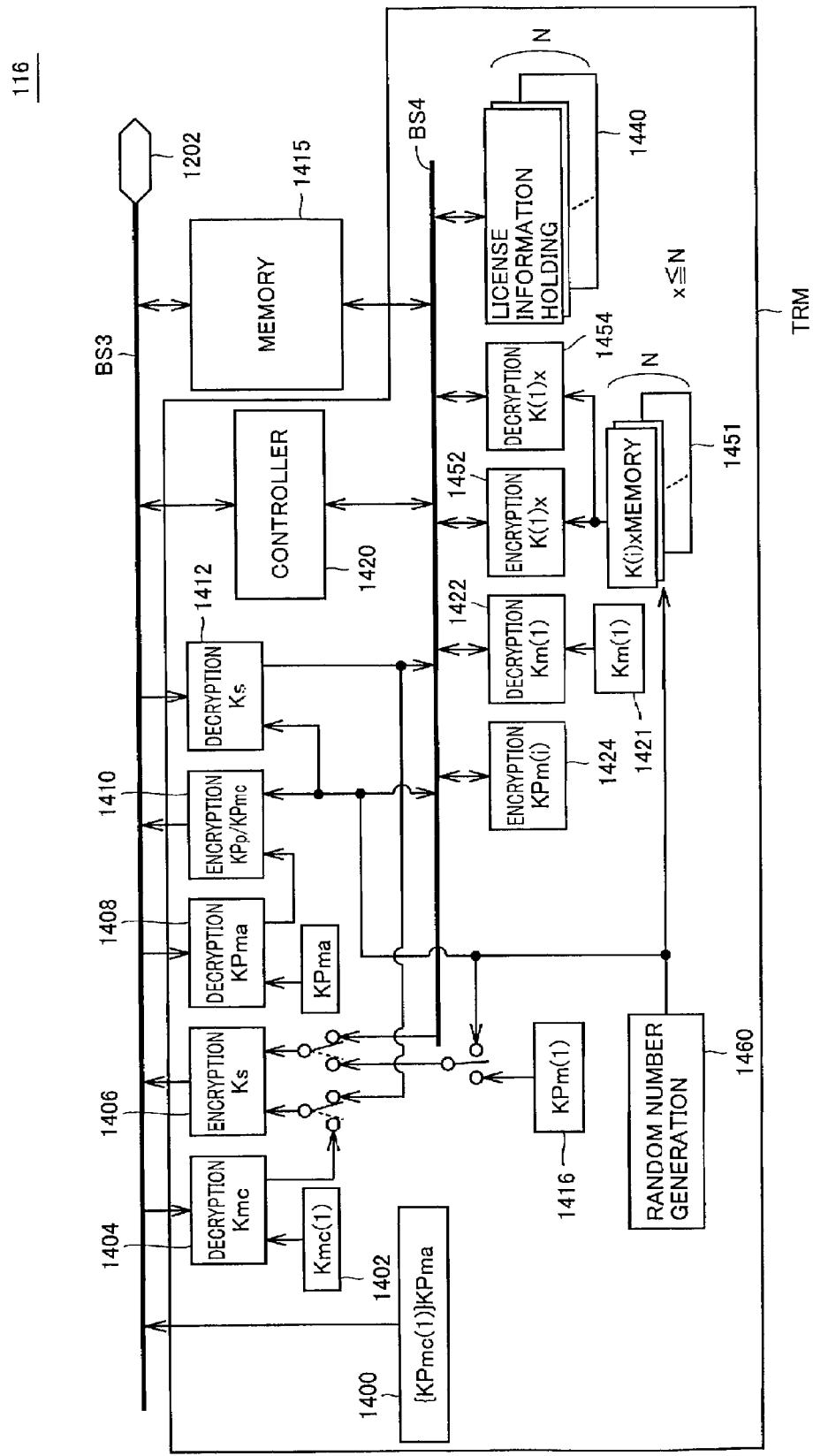
FIG. 18 is a block diagram showing a structure of a memory card 116 according to the third embodiment, and corresponds to FIG. 13 showing the second embodiment.

FIG. 18 is a block diagram showing a structure of memory card 116 of the third embodiment, and corresponds to FIG. 13 showing the second embodiment.

Referring to FIG. 18, memory card 116 differs from memory card 114 of the second embodiment shown in FIG. 13 in that a random number generating circuit 1460 employed in place of session key generating circuit 1418 produces session keys Ks2 and Ks3, and further produces secret symmetric key K(1)x ($1 \leq x \leq N$) in response to each processing of writing the reproduction information. K(1)x holding portion 1451 includes banks N, which correspond to the N banks in license information holding portion 1440, respectively, and is configured to record secret symmetric key K(1)j generated by random number generating circuit 1460 in bank j of K(1)x holding portion 1451 when recording the license information, which is a part of the reproduction information, in bank j ($1 \leq j \leq N$) of license information holding portion 1440. Recorded secret symmetric key K(1)j is used by encryption processing portion 1452 for encrypting the reproduction information for the license information recorded in bank j of the license information holding portion. In the third embodiment, therefore, encryption processing portion 1452 and decryption processing portion 1454 are configured to perform the encryption or decryption with secret symmetric key K(1)x, which is different from those for the other encrypted content data and thus other reproduction information, under the control of controller 1420.

Structures other than the above are substantially the same as those of memory card 114 of the second embodiment. The same portions bear the same reference numbers, and description thereof is not repeated.

Figure 19:
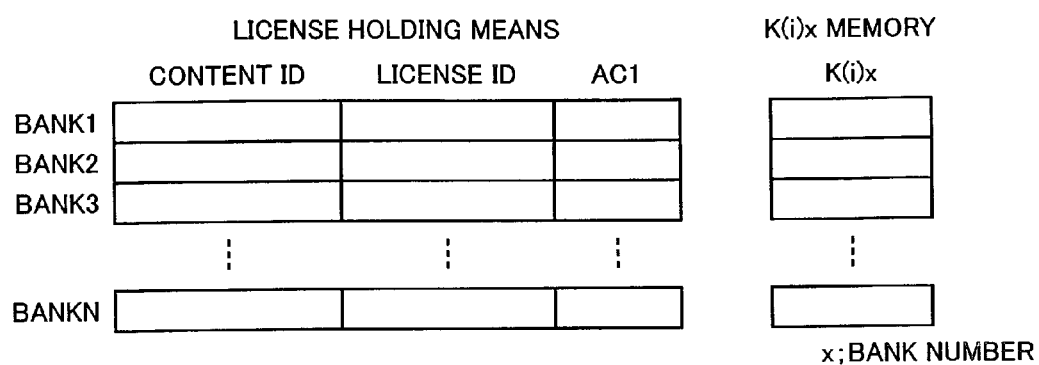
FIG. 19 conceptually shows allocation of storage regions in license information holding portion 1440 and K(1)x holding portion 1451 shown in FIG. 18.

FIG. 19 conceptually shows allocation of storage regions in license information holding portion 1440 and K(1)x holding portion 1451 shown in FIG. 18.

License information holding portion 1440 has N (N: natural number) banks, and holds the license information (content ID, license ID and access restriction information AC1), which is a part of reproduction information, in each bank. K(1)x holding portion 1451 likewise has N (N: natural number) banks, and each bank j stores corresponding secret symmetric key K(1)j, which is generated by random number generating circuit 1460 in response to every recording of the license information in bank j of license information holding portion 1440 during the distribution session or transfer session (receiving side).

Figure 20:
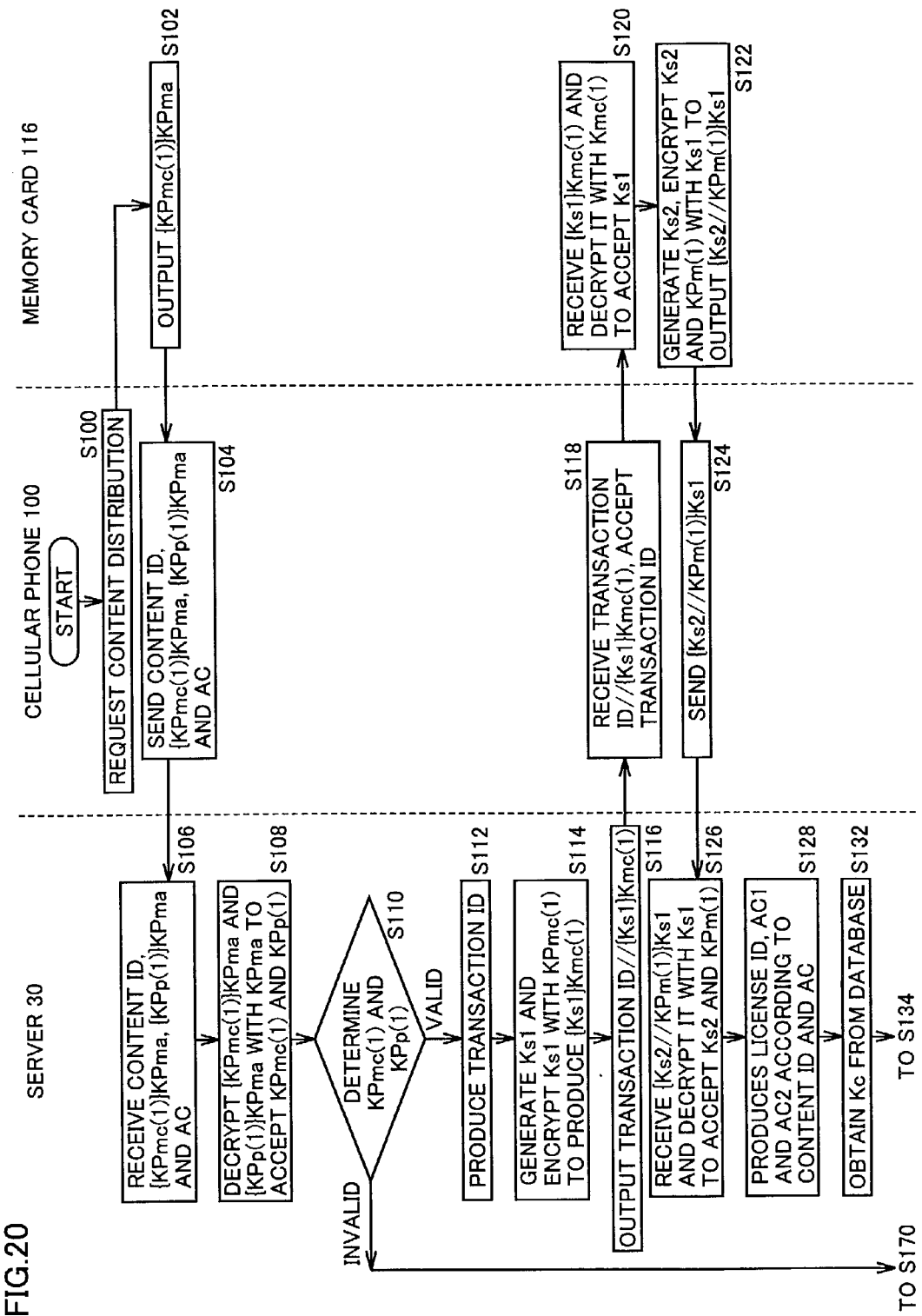
FIG. 20 is a first flowchart representing a distributing operation performed when purchasing contents in a data distribution system according to the third embodiment.
Figure 21:
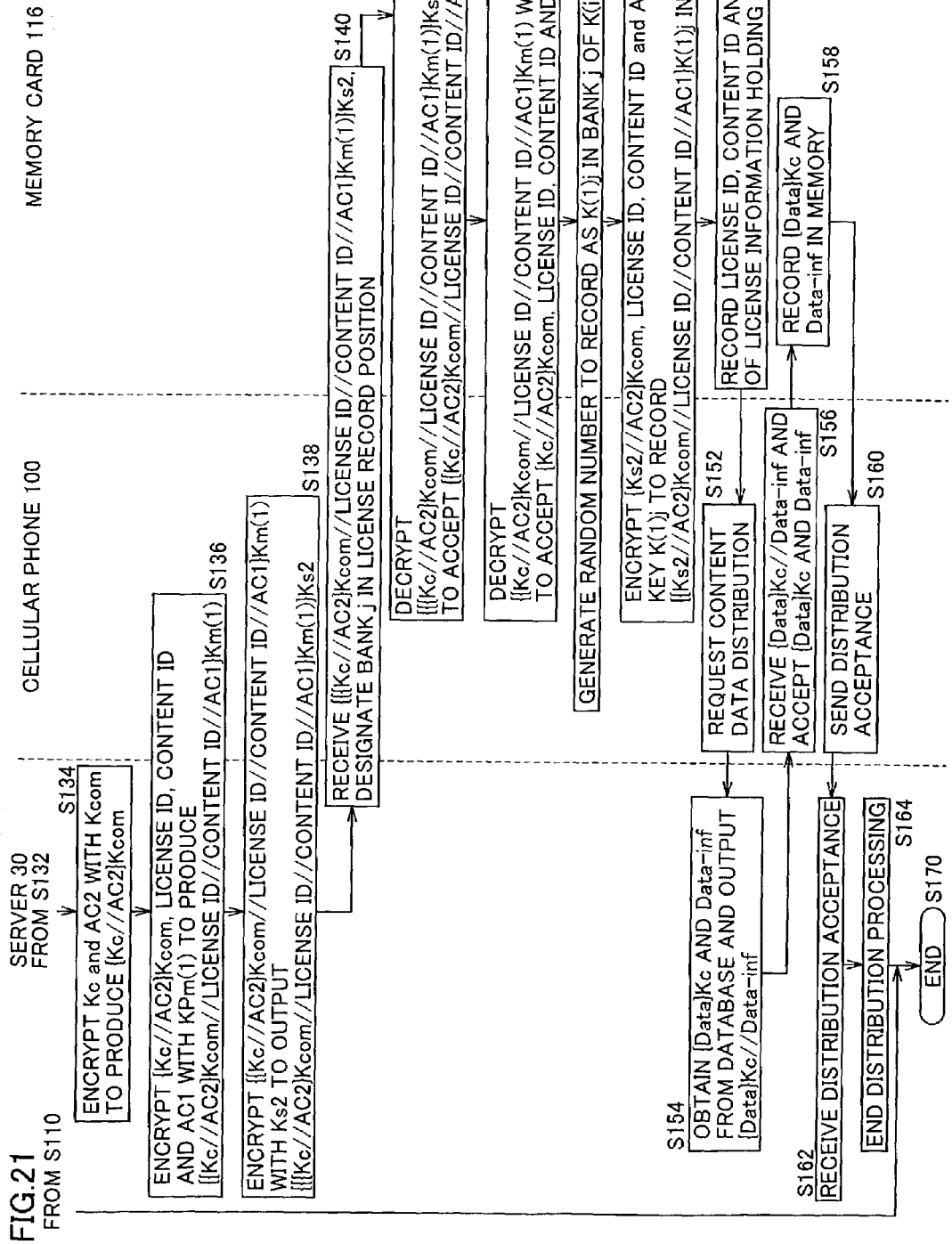
FIG. 21 is a second flowchart representing the distributing operation performed when purchasing contents in the data distribution system according to the third embodiment.

FIGS. 20 and 21 are first and second flowcharts representing the distributing operation performed when purchasing the contents in the data distribution system according to the third embodiment, and correspond to FIGS. 15 and 16 showing the second embodiment, respectively.

FIGS. 20 and 21 represent the operations, in which the user uses a memory card 116, and receives the content data distributed from distribution server 30 via cellular phone 100.

In contrast to the distribution processing using memory card 114 of the second embodiment, memory card 116 operates as follows. If the license information is to be written into the jth bank, random number generating portion 1460 produces a random number, and stores it as secret symmetric key K(1)j in bank j of K(1)x holding portion 1451.

Processing other than the above is substantially the same as that in the distributing operation of the first embodiment. The same operations and steps bear the same reference numbers, and description thereof is not repeated.

The reproduction operation and transfer operation of memory card 116 of the third embodiment are basically the same as those of the second embodiment.

Owing to the above structure, the security level for the content data can be further increased.

The processing in each of the first, second and third embodiments is different from the processing in the other embodiments only in the processing within the memory card, and there is no difference in encryption of data performed outside the memory card. In connection with the combination of the sending and receiving sides, however, the transfer operations can be performed using any combination of memory cards 110, 114 and 116, which have been described in the respective embodiments.

Accordingly, memory cards 110, 114 and 116 are compatible with each other.

[Fourth Embodiment]

A data distribution system of a fourth embodiment differs from the data distribution system of the first embodiment in that the distribution server and the cellular phone do not utilize the encryption and decryption with secret common key Kcom common to all the reproducing circuit.

More specifically, the data distribution system of the fourth embodiment employs a license server 11 instead of license server 10, which is employed in distribution server 30 of the data distribution system of the first embodiment shown in FIG. 3. The data distribution system of the fourth embodiment employs a cellular phone 103 having a structure other than that of cellular phone 100 already described in FIG. 4.

FIG. 22 represents characteristics of the data, information and others used for the communication in the data distribution system of the fourth embodiment, and correspond to FIG. 2 showing the first embodiment. However, characteristics in FIG. 22 are the same as those in FIG. 2 except for secret common key Kcom is not represented, and therefore, description thereof is not repeated.

Figure 23:
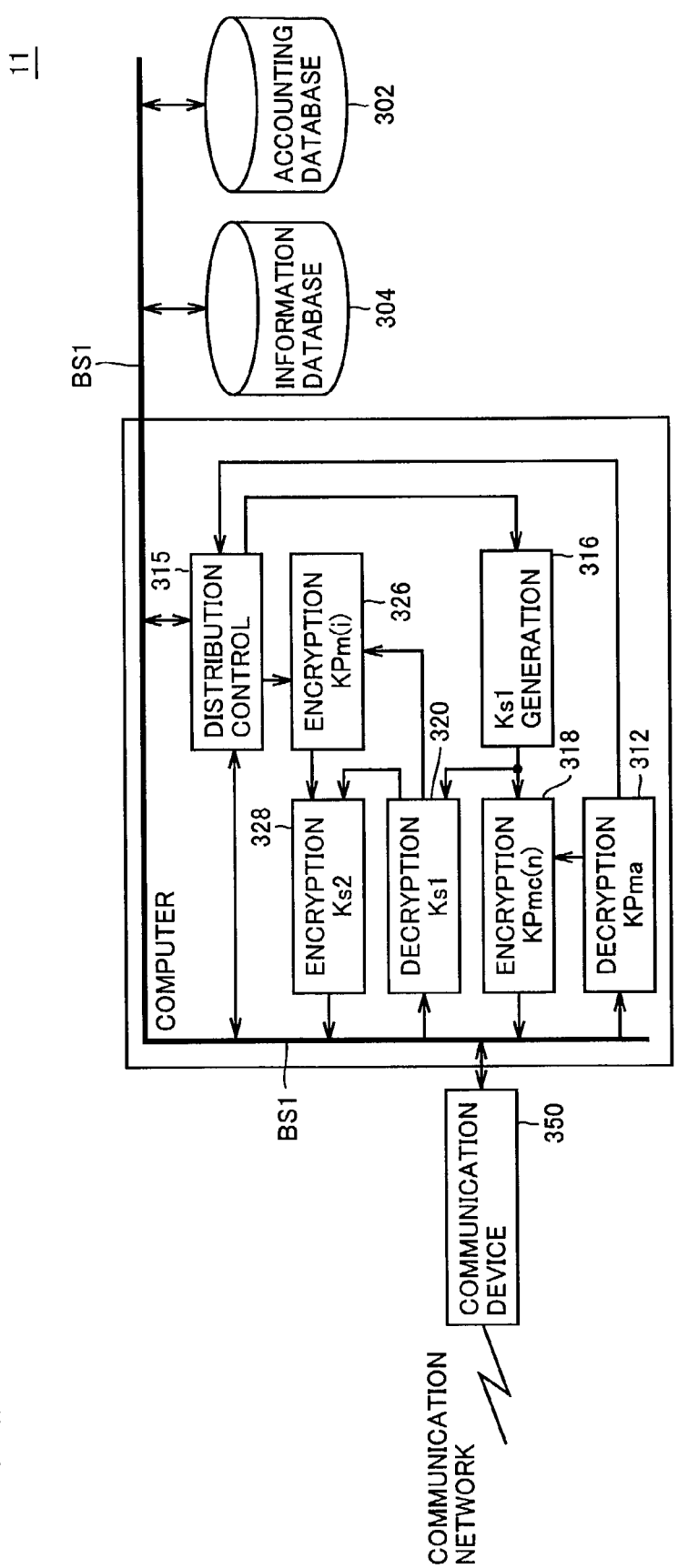
FIG. 23 is a schematic block diagram showing a structure of a license server 11 in the data distribution system according to the fourth embodiment.

FIG. 23 is a schematic block diagram showing a structure of license server 11 of the data distribution system according to the fourth embodiment.

License server 11 differs from license server 10 in that license server 11 does not employ holding portion 322 of secret common key Kcom common to all the reproducing circuit as well as encryption processing portion 324 for performing the encryption using secret common key Kcom as the encryption key. In a distribution server 31, therefore, license key Kc and reproducing circuit restriction information AC2, which are output from distribution control portion 315, are directly sent to encryption processing portion 326. Circuit structures and operations other than the above are substantially the same as those of license server 10 shown in FIG. 3, and therefore description thereof is not repeated.

In the following description, license server 11, authentication server 12 and distribution carrier 20 are collectively referred to as "distribution server 31" hereinafter.

Figure 24:
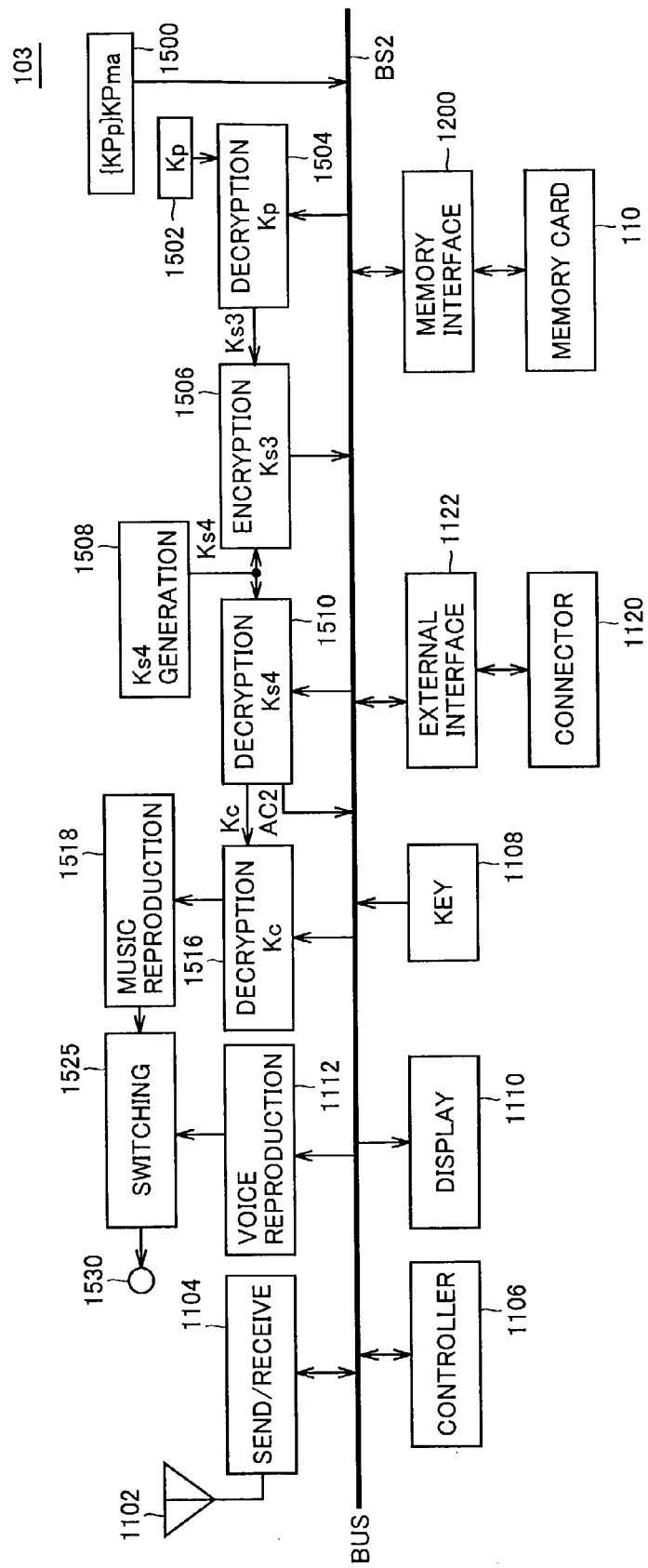
FIG. 24 is a schematic block diagram showing a structure of a cellular phone 103 used in the data distribution system according to the fourth embodiment.

FIG. 24 is a schematic block diagram showing a structure of cellular phone 103 used in the data distribution system of the fourth embodiment.

Referring to FIG. 24, cellular phone 103 differs from cellular phone 100 of the first embodiment shown in FIG. 4 in that Kcom holding portion 1512 for holding secret common key Kcom symmetric to the reproducing circuit and decryption processing portion 1514 using secret common key Kcom are not employed.

Corresponding to the fact that distribution server 31 does not perform the encryption with secret common key Kcom, license key Kc in cellular phone 103 can be directly obtained by decryption processing portion 1510 performing the decryption with session key Ks4, and therefore cellular phone 101 is configured to apply license key Kc directly to decryption processing portion 1510. Circuit structures and operations other than the above are substantially the same as those of cellular phone 100. Description of the same structures and operations is not repeated.

The memory card used in the data distribution system of the fourth embodiment has the same structure as that of memory card 110 shown in FIG. 5, and therefore description thereof is not repeated.

By eliminating the encryption with secret common key Kcom common to all the reproducing circuit, differences occur in operation during distribution and reproduction sessions. These differences will now be described with reference to flowcharts.

Figure 25:
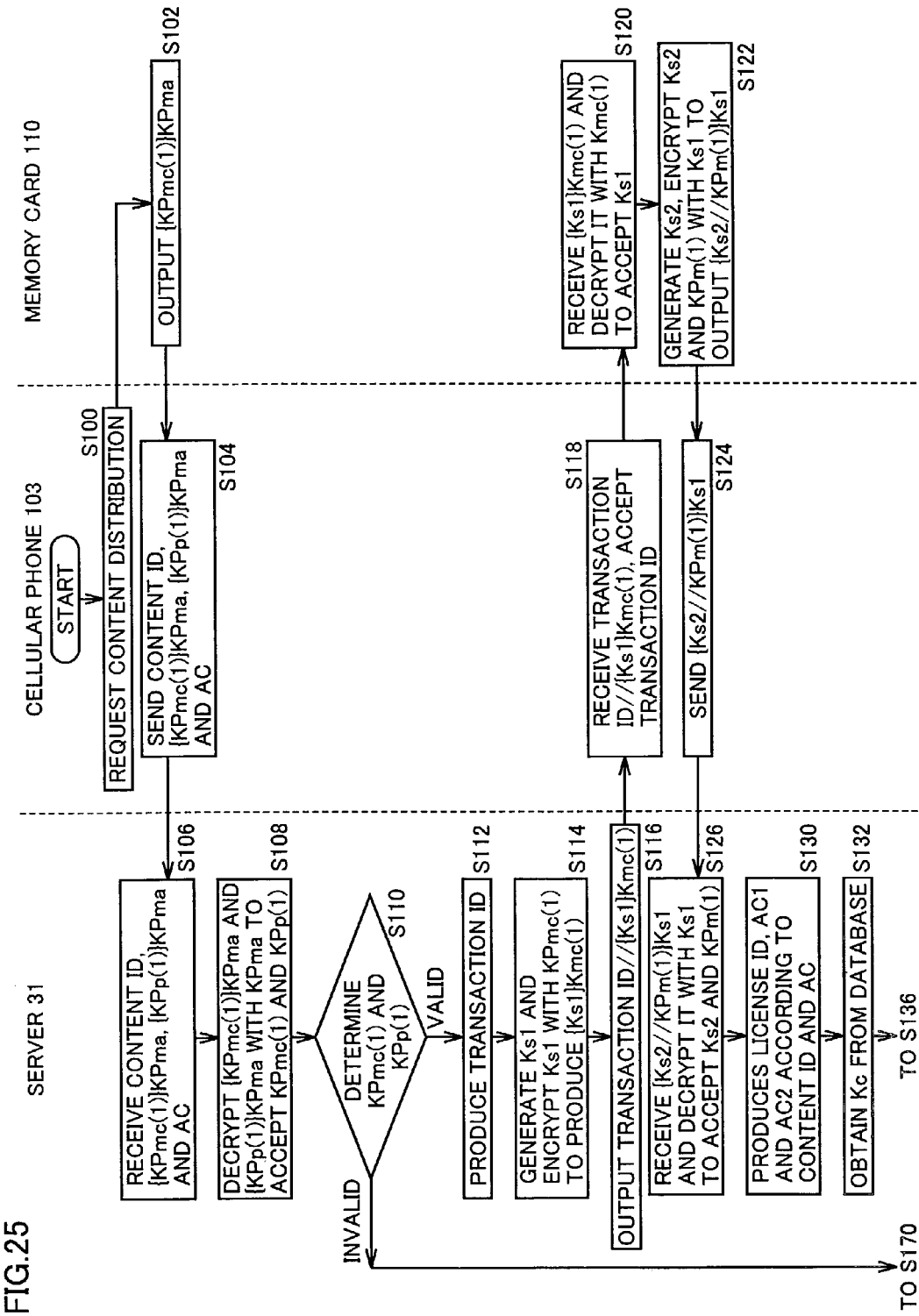
FIG. 25 is a first flowchart representing a distributing operation in the data distribution system according to the fourth embodiment.
Figure 26:
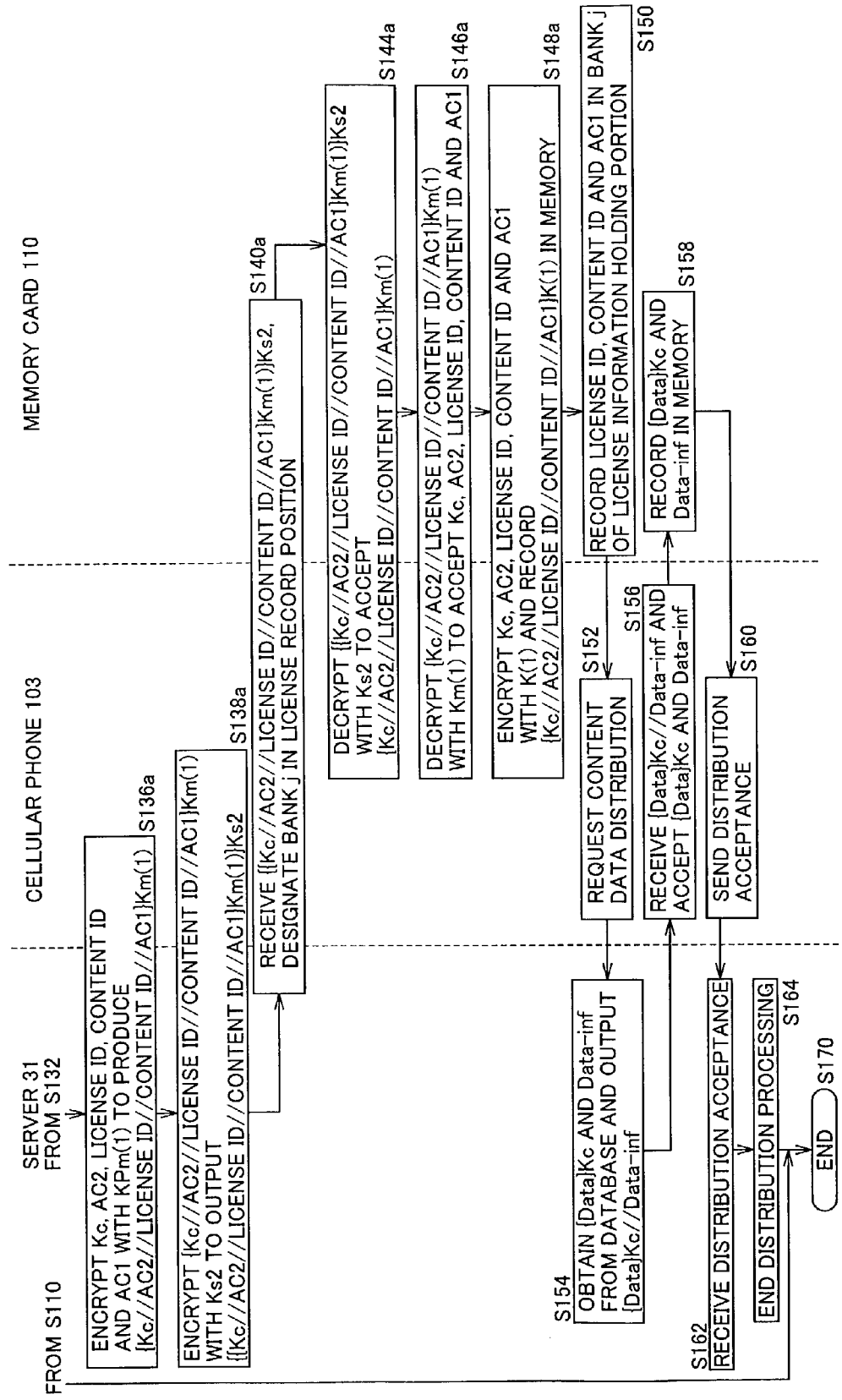
FIG. 26 is a second flowchart representing the distributing operation in the data distribution system according to the fourth embodiment.

FIGS. 25 and 26 are first and second flowcharts showing a distributing operation in the data distribution system according to the fourth embodiment, respectively. With reference to FIG. 25, description will now be given on only differences from the distributing operation of the data distribution system of the first embodiment, which is represented in the flowcharts of FIGS. 7 and 8.

Referring to FIGS. 25 and 26, the processing in and before step S132 is the same as that represented in the flowchart of FIG. 7.

As already described with reference to FIG. 23, license key Kc and reproducing circuit restriction information AC2 obtained in step S132 are encrypted with public encryption key KPm(1) unique to memory card 110 without being encrypted with secret common key Kcom. Therefore, step S134 is eliminated.

Subsequently to step S132, steps S136a–S146a are executed instead of steps S136–S146. In each of steps S136a–148a, license key Kc and reproducing circuit restriction information AC2 are handled in the form of Kc//AC2 instead of the form of {Kc/AC2}Kcom handled in steps S136–S148. Other steps and operations in the encryption and decryption processing are substantially the same as those already described with reference to FIG. 8, and therefore description thereof is not repeated.

Figure 27:
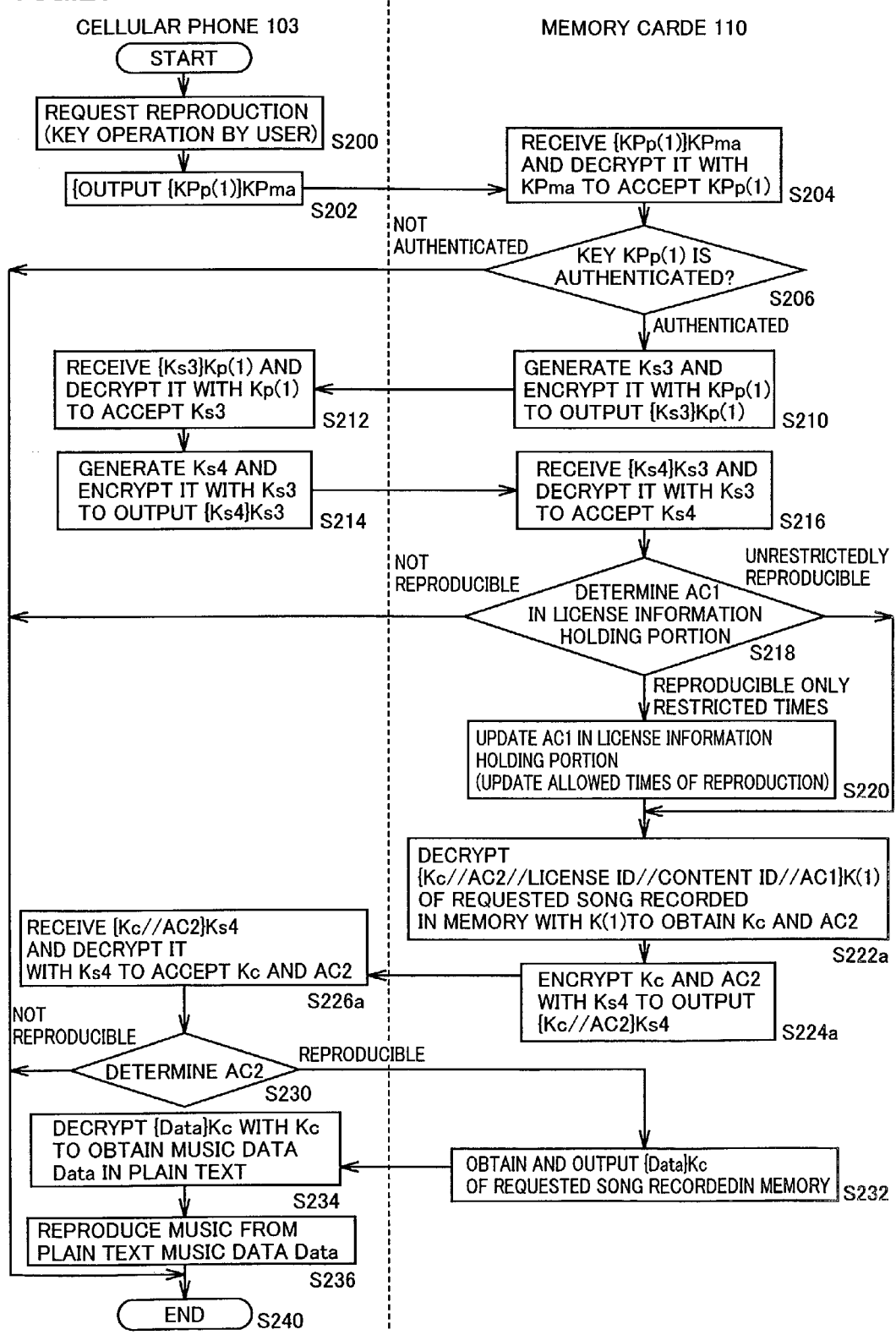
FIG. 27 is a flowchart representing the reproducing operation in the data distribution system according to the fourth embodiment.

FIG. 27 is a flowchart representing the reproducing operation in the data distribution system according to the fourth embodiment.

Referring to FIG. 27, the reproducing operation in the data distribution system of the fourth embodiment differs from the distributing operation in the data distribution system of the first embodiment shown in FIG. 9 in that steps S222a–S226a are executed instead of steps S222–S226. In each of steps S222a–S226a, license key Kc and reproducing circuit restriction information AC2 are handled in the form of Kc//AC2 instead of the form of {Kc/AC2}Kcom handled in steps S222–S226. Other steps and operations in the encryption and decryption processing are substantially the same as those already described with reference to FIG. 10, and therefore description thereof is not repeated. Further, license key Kc and reproducing circuit restriction information AC2 are encrypted with secret symmetric key K(1) unique to memory card 110 without being encrypted with secret common key Kcom. Therefore, step S228 is eliminated. Steps other than the above are substantially the same as those in FIG. 9, and therefore description thereof is not repeated.

The transfer operation is substantially the same as that of the first embodiment in that license key Kc and reproducing circuit restriction information AC2 are not encrypted with secret common key Kcom.

Owing to the above structure, the data distribution system providing the effects similar to those of the data distribution system of the first embodiment can be achieved by the structure, which does not use secret common key Kcom common to all the reproducing circuit and corresponding secret common key Kcom.

The data distribution systems of the second and third embodiments may employ the distribution server and the cellular phone, which do not utilize the encryption and decryption based on secret common key Kcom common to all the reproducing circuit.

In all the embodiments already described, the reproduction information distributed from the distribution server is received in such a manner that authentication data {KPm(1)}KPma and {KPp(1)}KPma of the memory card and the cellular phone (content reproducing circuit) are sent to the distribution server (step S104), the distribution server receives them (step S106), and decrypts it with authentication key KPma (step S108), and then authentication processing for both the memory card and the cellular phone (content reproducing circuit) are performed in accordance with results of the decryption. However, (i) it is not essential that the content reproducing circuit for reproducing the music is the same as the cellular phone receiving the distributed data because the memory card is removably. Further, (ii) when a part of reproduction information (i.e., license key Kc and reproducing circuit restriction information AC2) is to be sent from the memory card for performing the reproduction, the memory card internally performs the authentication processing on authentication data {KPm(1)}KPma of the content reproducing circuit on the receiving side, and the security level does not lower even if the authentication processing of authentication data {KPm(1)}KPma of the content reproducing circuit is not performed in the distribution server. For these reasons, such a structure may be employed that the authentication processing of authentication data {KPm(1)}KPma of the content reproducing circuit is not performed in the distribution server.

In this case, the cellular phone sends the content ID, authentication data {KPm(1)}KPma of the memory card and license purchase condition data AC in step S104, and the distribution server sends the content ID, authentication data {KPm(1)}KPma of the memory card and license purchase condition data AC in step S106, and decrypts authentication data {KPm(1)}KPma with authentication key KPma to accept public encryption key KPm(1). Subsequently, the authentication processing is performed based on results of the decryption, or results of inquiry to the authentication server, and it is determined whether public encryption key KPm(1) was issued from a valid device or not. Subsequent processing is performed in accordance with the results of this determination as well as the results of determination relating to authentication data {KPm(1)}KPma of the memory card. Only the changes described above are required, and no change is required in the reproduction and transfer.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A recording device (110) for receiving and recording data encrypted with a first public encryption key (KPm(i)) predetermined with respect to the recording device, and used for decrypting encrypted content data, comprising:
 a first key holding portion (1421) for holding a first private decryption key (Km(i)) being asymmetric to said first public encryption key and used for decrypting data encrypted with said first public encryption key;
 a first decryption processing portion (1422) for receiving a license key encrypted with said first public encryption key, and decrypting the received data with said first private decryption key;
 a second key holding portion (1450, 1451) for holding at least one secret unique key (K(i)) being unique to said recording device and being symmetric in a symmetric key cryptosystem;
 a first encryption processing portion (1452) for receiving and encrypting said license key again with said secret unique key;

a recording portion for receiving and storing the output of said first encryption processing portion; and a second decryption processing portion (1454) for decrypting said license key stored in said recording portion with said secret unique key.

2. The recording device according to claim 1, further comprising:

a third key holding portion (1402) for holding a second private decryption key (Kmc(n)) used for decrypting data encrypted with a second public encryption key (KPmc(n)) predetermined with respect to said recording device;

a third decryption processing portion (1404) for receiving a first symmetric key (Ks1) updated in response to every input/output of said license key and encrypted with said second public encryption key, and performing decryption with said second private decryption key;

a fourth key holding portion (1416) for holding said first public encryption key;

a session key generating portion (1418) for generating a second symmetric key (Ks2) in response to every input/output of said license key;

a second encryption processing portion (1406) for receiving and encrypting said first public encryption key and the output of said session key generating portion with said first symmetric key; and a fourth decryption processing portion (1412) for decrypting with said second symmetric key the data encrypted with said first public encryption key and further encrypted with said second symmetric key, and applying the decrypted data to said first decryption processing portion.

3. The recording device according to claim 1, wherein said first private decryption key is a private decryption key being unique to said recording device and being predetermined for said recording device.

4. The recording device according to claim 1, wherein said second key holding portion holds a predetermined plural number of said secret unique keys capable of corresponding to said respective license key stored in said recording portion.

5. The recording device according to claim 1, further comprising:

a random number generating portion (1460) for producing said secret unique key from a random number, wherein said second key holding portion (1451) holds a plurality of said secret unique keys produced corresponding to respective inputs of said license key in forms corresponding to said encrypted data.

6. The recording device according to claim 2, wherein said session key generating portion further produces said secret unique key corresponding to every input of the data, and said second key holding portion holds said plurality of produced secret unique keys in forms corresponding to said license key.

7. The recording device according to claim 2, further comprising:

an authentication data holding portion (1400) holding authentication data prepared by encrypting said predetermined second public encryption key corresponding to said recording device into a form allowing authentication with an authentication key (Kpma), and being capable of externally outputting said authentication data.

8. The recording device according to claim 2, further comprising:

an authentication data holding portion holding authentication data prepared by encrypting said predetermined second public encryption key corresponding to said recording device and data for authenticating said recording device into a form allowing authentication with an authentication key, and being capable of externally outputting said authentication data.

9. The recording device according to claim 2, wherein said recording device accepts authentication data prepared by encrypting an externally applied third public encryption key into a form decodable with an authentication key in response to every output of said license key; and said recording device further comprises:

an authentication key holding portion for holding said authentication key, an authentication processing portion (1420) for decrypting with said authentication key said authentication data prepared by encrypting said externally applied third public encryption key into a form decodable with said authentication key, and determining based on belonging data produced by the decryption processing whether said third public encryption key is to be accepted or not, and a third encryption processing portion (1410) for encrypting the second symmetric key generated by said session key generating portion with said third public encryption key, and externally outputting the encrypted second symmetric key when said authentication processing portion accepts said third public encryption key.

10. The recording device according to claim 9, further comprising:

a third encryption processing portion (1424) for encrypting an externally applied fourth public encryption key (KPm(j)) encrypted together with said first symmetric key with said second symmetric key, wherein said fourth decryption processing portion decrypts said first symmetric key and said fourth public encryption key encrypted with said second symmetric key, said second decryption processing portion decrypts said license key stored in said recording portion;

said fourth encryption processing portion encrypts the output of said second decryption processing portion with said fourth public encryption key, and said second encryption processing portion further encrypts the output of said fourth encryption processing portion with said first symmetric key, and outputting the encrypted output.

11. The recording device according to claim 1, wherein said recording device receives and further records encrypted content data corresponding to said license key, said recording portion includes:

a first recording portion for storing said license key encrypted by said first encryption processing portion, and a second recording portion for storing said encrypted content data applied to said second recording portion as it is.

12. The recording device according to claim 11, wherein said recording portion has a control information recording portion (1440) for receiving control information applied together with said license key after being encrypted with said first public encryption key, and relating to output of said license key, and for recording said control information decrypted by said first decryption processing portion; and said recording device further comprises a control portion for controlling output of said license key in response to an external request for output of said license key and in accordance with said control information recorded in said control information recording portion.

13. The recording device according to claim 1, wherein said recording portion is a memory card.

14. The recording device according to claim 9, wherein said fourth decryption processing portion decrypts said first symmetric key decrypted with said second symmetric key, said second decryption processing portion decrypts data stored in said recording portion, and said second encryption processing portion encrypts the output of said second decryption processing portion with said first symmetric key, and outputting the encrypted output.

* * * * *